US006571848B2

(12) United States Patent

Tsuken et al.

(10) Patent No.: US 6,571,848 B2
(45) Date of Patent: Jun. 3, 2003

(54) SEALING APPARATUS

(75) Inventors: Tadaaki Tsuken, Ibaraki (JP); Norio Mori, Ibaraki (JP); Kazuo Okabayashi, Hojyo (JP); Noriyuki Tanaka, Hojyo (JP); Kazushi Hayano, Hojyo (JP); Shigenori Hato, Hojyo (JP); Yoshinori Fukuda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 209 days.

(21) Appl. No.: 09/755,198

(22) Filed: Jan. 8, 2001

(65) Prior Publication Data

US 2002/0005258 A1 Jan. 17, 2002

(30) Foreign Application Priority Data

Jul. 10, 2000 (JP) ....................................... 2000-207906

(51) Int. Cl.[7] ................................................ B32B 31/00

(52) U.S. Cl. ........................ 156/361; 156/468; 156/486; 156/522

(58) Field of Search ................................ 156/391, 468, 156/475, 486, 522, 543, 552, 361, 363

(56) References Cited

U.S. PATENT DOCUMENTS 4,238,269 A * 12/1980 Deering, Jr. ................ 156/465
4,327,634 A * 5/1982 Colmon et al. ......... 100/155 G
4,610,123 A * 9/1986 Krone et al. ................ 188/187
5,112,004 A * 5/1992 Tipton ......................... 226/189
5,454,776 A * 10/1995 Ulrich et al. ............... 493/117
5,716,313 A * 2/1998 Sigrist et al. ............... 493/438
5,772,568 A * 6/1998 Chen .......................... 493/116
5,870,881 A * 2/1999 Rice et al. ................. 53/136.4
6,082,661 A * 7/2000 Focke et al. ............. 242/554.3
6,185,868 B1 * 2/2001 Kato ........................... 192/35
6,375,192 B1 * 4/2002 Uchiyama et al. .......... 273/331

* cited by examiner

*Primary Examiner*—Richard Crispino
*Assistant Examiner*—Cheryl N. Hawkins
(74) *Attorney, Agent, or Firm*—Rader, Fishman & Grauer PLLC

(57) ABSTRACT

A sealing apparatus includes an adhesive tape applying mechanism disposed at least below a transport path along which a workpiece is horizontally transported. The adhesive tape applying mechanism includes an adhesive tape roll RT and an applicator unit 10. An adhesive tape drawn from the adhesive tape roll RT is guided to and wound around an applicator roller 25 of the applicator unit, to be applied continuously to surfaces of the workpiece transported along the transport path. The adhesive tape applying mechanism disposed below the transport path is supported to be vertically pivotable about a pivotal axis x between a tape applying position and an adhesive tape roll changing position exposed above the transport path.

22 Claims, 26 Drawing Sheets

Fig.28
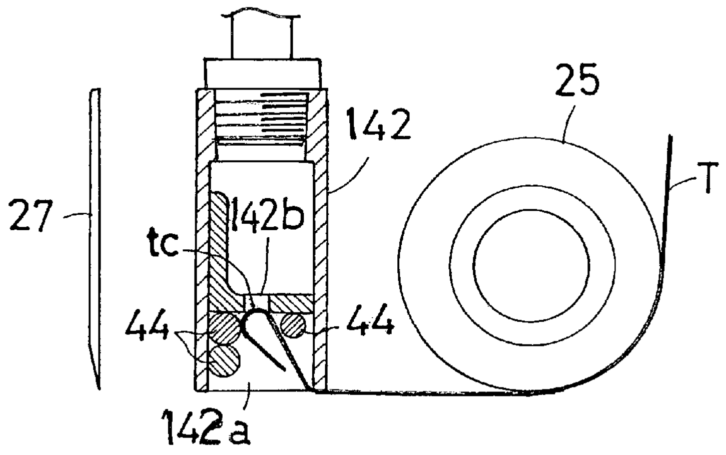
Fig.29A
Fig.29B
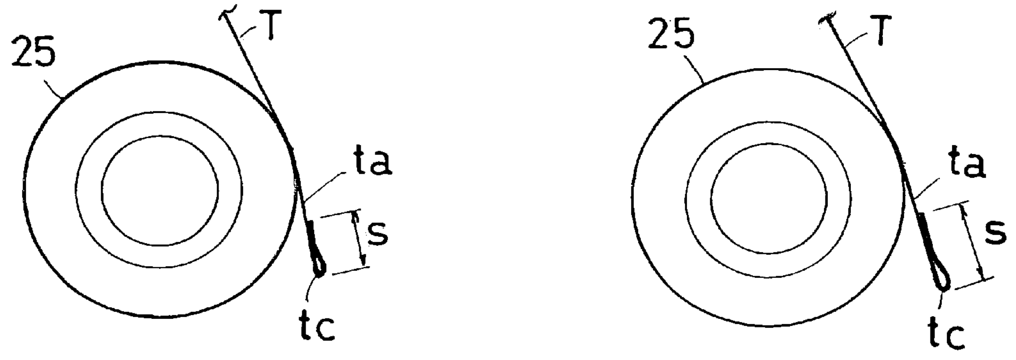
Fig.30
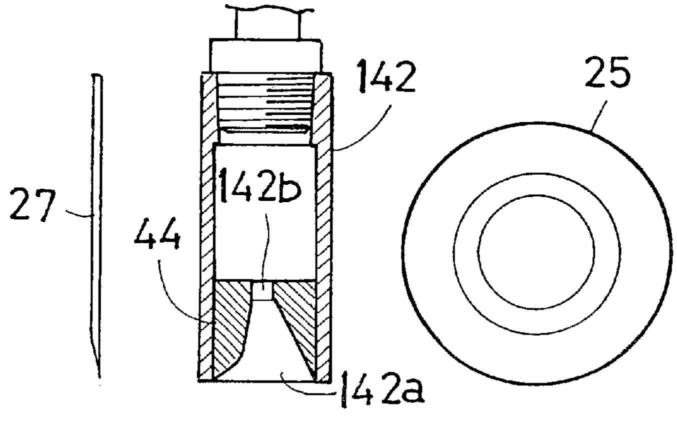

SEALING APPARATUS

BACKGROUND OF THE INVENTION (1) Field of the Invention

This invention relates generally to a sealing apparatus for sealing, with adhesive tape, cartons used in packing and transporting various articles.

(2) Description of the Related Art

In such a carton sealing apparatus, adhesive tape drawn from an adhesive tape roll is guided to and wound on an applicator roller included in an applicator unit. The applicator unit successively applies the adhesive tape to selected surfaces of cartons transported along a transport path. The transport path horizontally transports the cartons while holding the cartons at right and left sides thereof. One type of known apparatus includes adhesive tape applying mechanisms arranged above and below the transport path for sealing upper and lower surfaces of each carton at the same time. Another type of known apparatus includes an adhesive tape applying mechanism disposed only above the transport path. A third type of known apparatus includes an adhesive tape applying mechanism disposed only below the transport path. Each adhesive tape applying mechanism has an adhesive tape roll mounted in a fixed position thereof.

In the above conventional sealing apparatus, where the adhesive tape applying mechanism is disposed above the transport path, the adhesive tape roll may be changed in a large space over the transport path. However, where the adhesive tape applying mechanism is disposed below the transport path, the operator has to crouch into a constrained posture in a narrow space under the transport path to change the tape roll and pass the adhesive tape around the applicator roller and the like. Thus, it is difficult to carry out a roll changing operation and other contingent operations.

SUMMARY OF THE INVENTION

This invention has been made having regard to the state of the art noted above, and its object is to provide a sealing apparatus having an adhesive tape applying mechanism disposed below a transport path, which allows the operator to carry out a roll changing operation and other contingent operations efficiently in easy posture.

The above object is fulfilled, according to this invention, by a sealing apparatus having the following construction:

(1) The apparatus comprises an adhesive tape applying mechanism disposed at least below a transport path along which a workpiece is horizontally transported, the adhesive tape applying mechanism including an adhesive tape roll and an applicator unit, an adhesive tape drawn from the adhesive tape roll being guided to and wound around an applicator roller of the applicator unit, to be applied continuously to surfaces of the workpiece transported along the transport path;

wherein the adhesive tape applying mechanism disposed below the transport path is supported to be vertically pivotable between a tape applying position and an adhesive tape roll changing position exposed above the transport path.

With the above apparatus, when the adhesive tape roll is exhausted, the entire adhesive tape applying mechanism is swung upward about a pivotal axis to the adhesive tape roll changing position exposed above the transport path. The operator may then change the adhesive tape roll and pass the adhesive tape around the applicator roller and the like in a space over the transport path. After the changing operation, the entire adhesive tape applying mechanism is swung back down to the tape applying position below the transport path to perform a tape applying operation again.

That is, the adhesive tape applying mechanism operable below the transport path may be swung upward to the adhesive tape roll changing position above the transport path. Thus, the operator may change the adhesive tape roll and pass the adhesive tape around the applicator roller and the like in a large space easily and quickly without crouching down. The tape applying operation may be performed with a reduced downtime required for changing the adhesive tape roll, thereby increasing the efficiency of the entire sealing operation.

(2) In the apparatus (1) of this invention, the adhesive tape applying mechanism, preferably, is vertically pivotable about a pivotal axis defined by pivot grooves each having an open end and a pivot pin received in the pivot grooves;

positioning means being disposed away from the pivotal axis for receiving and supporting the adhesive tape applying mechanism in the tape applying position against downward movement;

the adhesive tape applying mechanism being detachably supported through the pivotal axis and the positioning means.

With this construction, the entire adhesive tape applying mechanism below the transport path may be detached simply by removing the pivot pin from the pivot grooves instead of taking the pivotal axis apart with a tool or the like.

That is, the pivotal axis of the adhesive tape applying mechanism may be taken apart simply without using a tool or the like. Thus, the entire adhesive tape applying mechanism may be detached simply to be inspected or serviced easily in a suitable location away from the sealing apparatus. Where the sealing apparatus includes adhesive tape applying mechanisms both above and below the transport path, the lower adhesive tape applying mechanism may be attached or detached to switch simply between a mode for sealing upper and lower surfaces of the workpiece at the same time, and a mode for sealing only the upper surface. This construction is effective to enhance flexibility of the apparatus.

(3) In the apparatus (2) of this invention, it is preferred that the pivot grooves each have a hooked shape with one end thereof open vertically;

the pivotal axis being set to a deep end of the hooked shape;

the positioning means including engaging grooves each having a vertically open end, and an engaging pin engageable with the engaging grooves.

With this construction, the tape applying mechanism in the tape applying position is immovable in fore and aft directions due to the engagement between the engaging grooves and engaging pin. The pivot pin is correctly engaged in the deep ends of the hooked pivot grooves to be immovable vertically and fore and aft. The engagement between the engaging grooves and engaging pin is maintained by the weight of the tape applying mechanism. The pivot pin and pivot grooves become movable relative to each other only by raising the adhesive tape applying mechanism to remove the engaging pin from the engaging grooves. Thus, the entire adhesive tape applying mechanism may be detached by taking the pivotal axis apart.

That is, the above construction combines the axis structure utilizing the hooked pivotal grooves and pivot pin and the positioning structure utilizing the engaging grooves and engaging pin. In the tape applying position, the pivotal axis is set to a correct state immovable vertically and fore and aft to secure a desired tape applying precision. Yet, the entire adhesive tape applying mechanism is detachable without requiring any special tool or the like.

(4) The apparatus (1) of this invention, preferably, further comprises an automatic lock mechanism for automatically locking the adhesive tape applying mechanism to the adhesive tape changing position when the adhesive tape applying mechanism is swung upward to the adhesive tape changing position.

With this construction, the adhesive tape applying mechanism swung up to the adhesive tape roll changing position may be maintained in that position.

That is, the adhesive tape applying mechanism is prevented from swinging down by gravity. The operator may change the adhesive tape roll and pass the adhesive tape around the applicator roller and the like in a large space easily and quickly without crouching down.

(5) The apparatus (1) of this invention, preferably, further comprises a stopper for maintaining the adhesive tape applying mechanism in the adhesive tape changing position after the adhesive tape applying mechanism is swung upward to the adhesive tape changing position.

With this construction, the adhesive tape applying mechanism swung up to the adhesive tape roll changing position may be maintained in that position.

That is, the adhesive tape applying mechanism is prevented from swinging down by gravity. The operator may change the adhesive tape roll and pass the adhesive tape around the applicator roller and the like in a large space easily and quickly without crouching down.

(6) The apparatus (1) of this invention, preferably, further comprises slide means for sliding the adhesive tape applying mechanism to and fro along a direction of transport of the workpiece.

With this construction, the lower adhesive tape applying mechanism may be slid forward or backward in the direction of transport to a selected position.

That is, where an obstructive mechanism or the like is present above and opposed to the lower adhesive tape applying mechanism, the lower tape applying mechanism may be swung upward after being moved forward or backward away from the upper mechanism. Thus, the operator may change the adhesive tape roll and pass the adhesive tape around the applicator roller and the like in a large space easily and quickly without crouching down.

(7) The apparatus (1) of this invention, preferably, further comprises a balance mechanism operable, when the adhesive tape applying mechanism is swung up to the adhesive tape roll changing position, to apply an upward biasing force counteracting a gravitational descending force of the adhesive tape applying mechanism, thereby steadily maintaining the adhesive tape applying mechanism in the adhesive tape roll changing position.

With this construction, when the adhesive tape roll is exhausted, the entire adhesive tape applying mechanism is swung upward about a pivotal axis to the adhesive tape roll changing position exposed above the transport path. The operator may then change the adhesive tape roll and pass the adhesive tape around the applicator roller and the like in a space over the transport path. When the entire adhesive tape applying mechanism is raised to the adhesive tape roll changing position, the balance mechanism applies an upward biasing force counteracting a gravitational descending force of the adhesive tape applying mechanism. Consequently, the adhesive tape applying mechanism is steadily maintained in the adhesive tape roll changing position without being locked thereto. After the tape roll changing operation, the entire adhesive tape applying mechanism is swung down, against the upward biasing force of the balance mechanism, to the tape applying position below the transport path to perform a tape applying operation again.

That is, the adhesive tape applying mechanism operable below the transport path may be swung upward to the adhesive tape roll changing position above the transport path. Thus, the operator may change the adhesive tape roll and pass the adhesive tape around the applicator roller and the like in a large space easily and quickly without crouching down. The tape applying operation may be performed with a reduced downtime required for changing the adhesive tape roll, thereby increasing the efficiency of the entire sealing operation.

(8) In the apparatus (7) of this invention, the balance mechanism, preferably, comprises an extendible and retractable gas damper extending between the adhesive tape applying mechanism and a frame.

With this construction, the gas damper is placed to extend between the adhesive tape applying mechanism and frame, with opposite pivotal points of the gas damper set so that the extending force of the gas damper balance the descending force of the adhesive tape applying mechanism in the roll changing position.

That is, the balance mechanism is formed compact by using a gas damper in the form of an extendible and retractable rod. The entire apparatus need not be remodeled on a large scale to incorporate the balance mechanism.

(9) In the apparatus (7) of this invention, the balance mechanism, preferably, comprises an extendible and retractable spring mechanism extending between the adhesive tape applying mechanism and a frame.

With this construction, the spring is placed to extend between the adhesive tape applying mechanism and frame, with opposite end positions of the spring set so that the extending force of the spring balance the descending force of the adhesive tape applying mechanism in the roll changing position.

That is, the balance mechanism is formed compact by using an extendible and retractable compression spring. The entire apparatus need not be remodeled on a large scale to incorporate the balance mechanism.

(10) The apparatus (7) of this invention, preferably, further comprises a resistance applying mechanism for applying a resistance to a descent of the adhesive tape applying mechanism in a range from a position to which the adhesive tape applying mechanism is lowered a predetermined amount from the adhesive tape roll changing position, to the tape applying position.

With this construction, when the adhesive tape applying mechanism is lowered to some extent from the adhesive tape roll changing position, the gravitational swinging moment of the adhesive tape applying mechanism exceeds the upward swinging moment based on the extending force of the balance mechanism. The balance mechanism becomes no longer effective, whereby the adhesive tape applying mechanism could fall by gravity. The resistance applying mechanism acts to apply a resistance to such a fall, thereby checking a rapid fall of the adhesive tape applying mechanism.

That is, the resistance applying mechanism checks a rapid fall of the adhesive tape applying mechanism in a range where the balance mechanism is ineffective. Thus, even when the operator's hand slips off while raising or lowering the adhesive tape applying mechanism, the latter will never crash down to damage the apparatus. The tape applying mechanism may be handled safely and easily.

(11) In the apparatus (1) of this invention, the adhesive tape applying mechanism, preferably, includes a tape cutting mechanism for adjustably cutting a length of the adhesive tape applied to the workpiece.

With this construction, the adhesive tape may be applied properly to the workpiece regardless of the size in the longitudinal direction (i.e. the length) of the workpiece transported along the transport path. In addition, the adhesive tape may be bent and applied in adjusted lengths to the front surface of the workpiece introduced into the apparatus and to the rear surface of the workpiece being unloaded from the apparatus.

(12) In the apparatus (1) of this invention, the adhesive tape applying mechanism, preferably, includes tape control means for placing the adhesive tape constantly in contact with a rugged surface of the workpiece to apply the adhesive tape thereto.

With this construction, the adhesive tape constantly follows any irregularities formed on a surface of the workpiece at an initial assembly stage.

That is, the workpiece may have profile variations formed at an initial stage, especially a ruggedness on the surface to which the adhesive tape is to be applied. Even so, the adhesive is applied reliably to such surface of the workpiece.

(13) In the apparatus (1) of this invention, the adhesive tape applying mechanism, preferably, includes tape folding means for folding back one of cut edges of the adhesive tape applied to the workpiece to join adhesive surface portions of the adhesive tape together.

With this construction, the adhesive tape is folded adjacent a cut edge thereof to join adhesive surface portions together, thereby forming a part not applied to the workpiece.

That is, the folded part formed on the adhesive tape applied to and sealing the workpiece may be gripped to peel the tape easily off the workpiece.

(14) In the apparatus (13) of this invention, the tape folding means, preferably, comprises a suction nozzle for sucking a region adjacent the one of cut edges to fold the region with the adhesive surface portions placed inside.

With this construction, a region adjacent the cut edge of the adhesive tape is drawn into the nozzle, whereby the adhesive surface portions are tucked in and joined together.

(15) The apparatus (1) of this invention, preferably, further comprises distortion correcting means for correcting a distortion of the workpiece occurring in time of initial assembly.

With this construction, the distortion correcting means corrects any profile variations due to a distortion of the workpiece occurring at an initial assembly stage. All workpieces are thereby adjusted to a uniform profile.

(16) The apparatus (1) of this invention, preferably, further comprises moving means for moving the apparatus.

With this construction, the apparatus is movable to a selected location.

That is, the apparatus may be moved to a selected location to perform an operation for applying the adhesive tape to workpieces and an operation for changing the adhesive tape.

(17) The apparatus (1) of this invention, preferably, further comprises an upper adhesive tape applying mechanism opposed, across the workpiece transported, to the adhesive tape applying mechanism disposed below.

With this construction, the workpiece transported along the transport path is sealed with the adhesive tape applied to both the lower surface and upper surface thereof.

That is, with adhesive tape applying mechanisms provided both above and below the transport path, the lower adhesive tape applying mechanism may be attached or detached to switch simply between a mode for sealing upper and lower surfaces of the workpiece at the same time, and a mode for sealing only the upper surface. This construction is effective to enhance flexibility of the apparatus. Where the workpiece has opened upper and lower surfaces, the adhesive tape may be applied to both surfaces at the same time, to improve operating efficiency.

(18) In the apparatus (17) of this invention, the upper adhesive tape applying mechanism, preferably, has an adjustable operative position for applying the adhesive tape to the workpiece.

With this construction, the adhesive tape may be applied to the upper surface of the workpiece regardless of the height of the workpiece.

(19) In the apparatus (17) of this invention, the upper adhesive tape applying mechanism, preferably, includes a tape cutting mechanism for adjustably cutting a length of the adhesive tape applied to the workpiece.

With this construction, the adhesive tape may be applied properly to the workpiece regardless of the size in the longitudinal direction (i.e. the length) of the workpiece transported along the transport path. In addition, the adhesive tape may be bent and applied in adjusted lengths to the front surface of the workpiece introduced into the apparatus and to the rear surface of the workpiece being unloaded from the apparatus.

(20) In the apparatus (17) of this invention, the upper adhesive tape applying mechanism, preferably, includes tape control means for placing the adhesive tape constantly in contact with a rugged surface of the workpiece to apply the adhesive tape thereto.

With this construction, the adhesive tape constantly follows any irregularities formed on the upper surface of the workpiece at an initial assembly stage.

That is, the workpiece may have profile variations formed at an initial stage, especially ruggedness on the surface to which the adhesive tape is to be applied. Even so, the adhesive is applied reliably on such surface of the workpiece.

(21) In the apparatus (17) of this invention, the upper adhesive tape applying mechanism, preferably, includes tape folding means for folding back one of cut edges of the adhesive tape applied to the workpiece to join adhesive surface portions of the adhesive tape together, thereby to facilitate separation of the adhesive tape from the workpiece.

With this construction, the adhesive tape is folded adjacent one of cut edges thereof to join adhesive surface portions together, thereby forming a part not applied to the workpiece.

That is, the folded part formed on the adhesive tape applied to and sealing the workpiece may be gripped to peel the tape easily off the workpiece.

(22) In the apparatus (17) of this invention, the tape folding means, preferably, comprises a suction nozzle for sucking a region adjacent the one of cut edges to fold the region with the adhesive surface portions placed inside.

With this construction, a region adjacent the cut edge of the adhesive tape is drawn into the nozzle, whereby the adhesive surface portions are tucked in and joined together.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 28 is a side view in vertical section of the suction nozzle in another operative state;

FIG. 29A is an enlarged side view of a leading end portion of a thin adhesive tape applied;

FIG. 29B is an enlarged side view of a leading end portion of a thick adhesive tape applied;

FIG. 30 is a side view in vertical section of a modified suction nozzle;

DESCRIPTION OF THE PREFERRED EMBODIMENTS

Preferred embodiments of this invention will be described in detail hereinafter with reference to the drawings.

First Embodiment

This invention will be described hereinafter as applied to a carton sealing apparatus with reference to the drawings.

Figure 1:
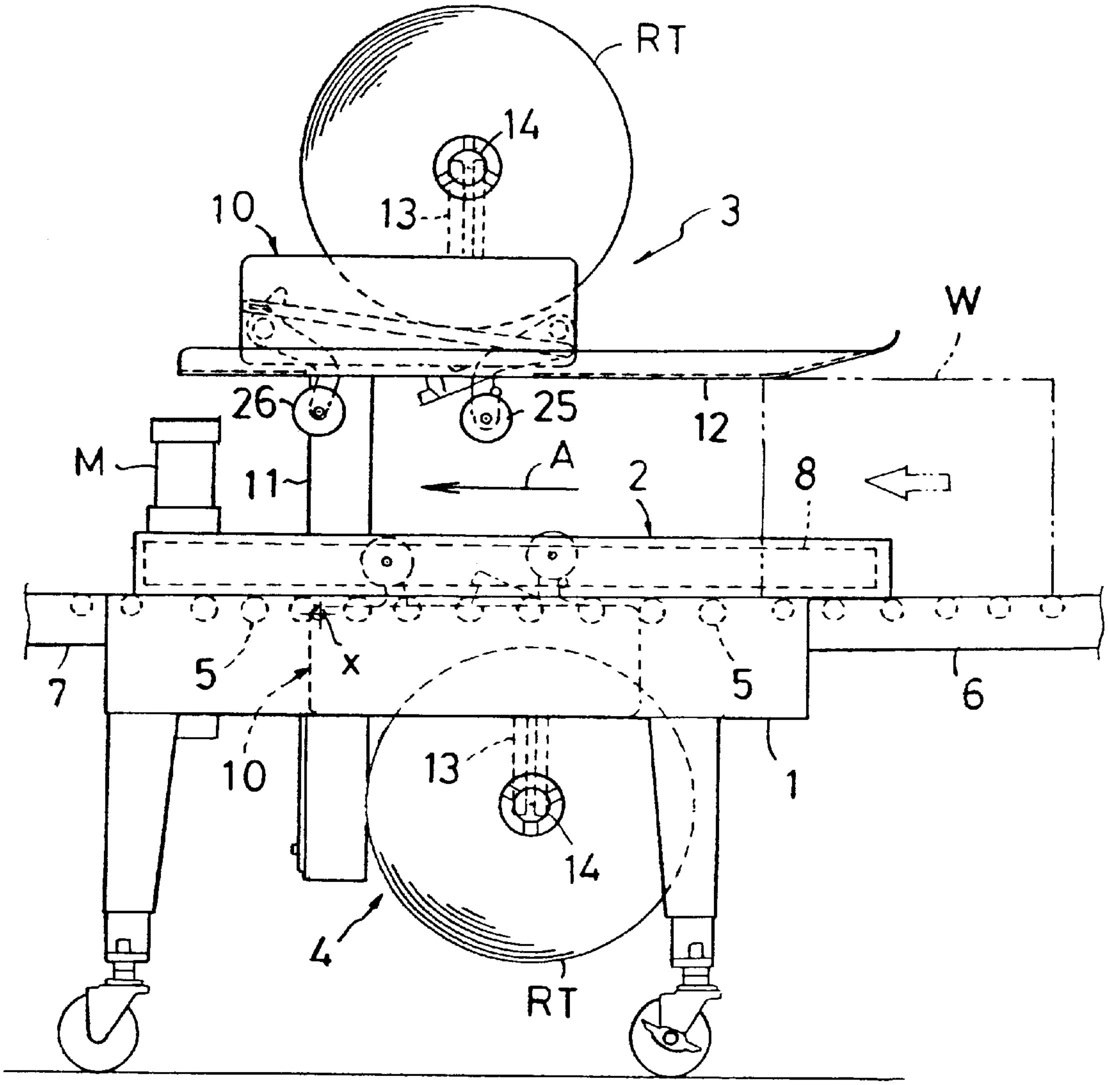
FIG. 1 is a side view of a carton sealing apparatus in a first embodiment of this invention.
Figure 2:
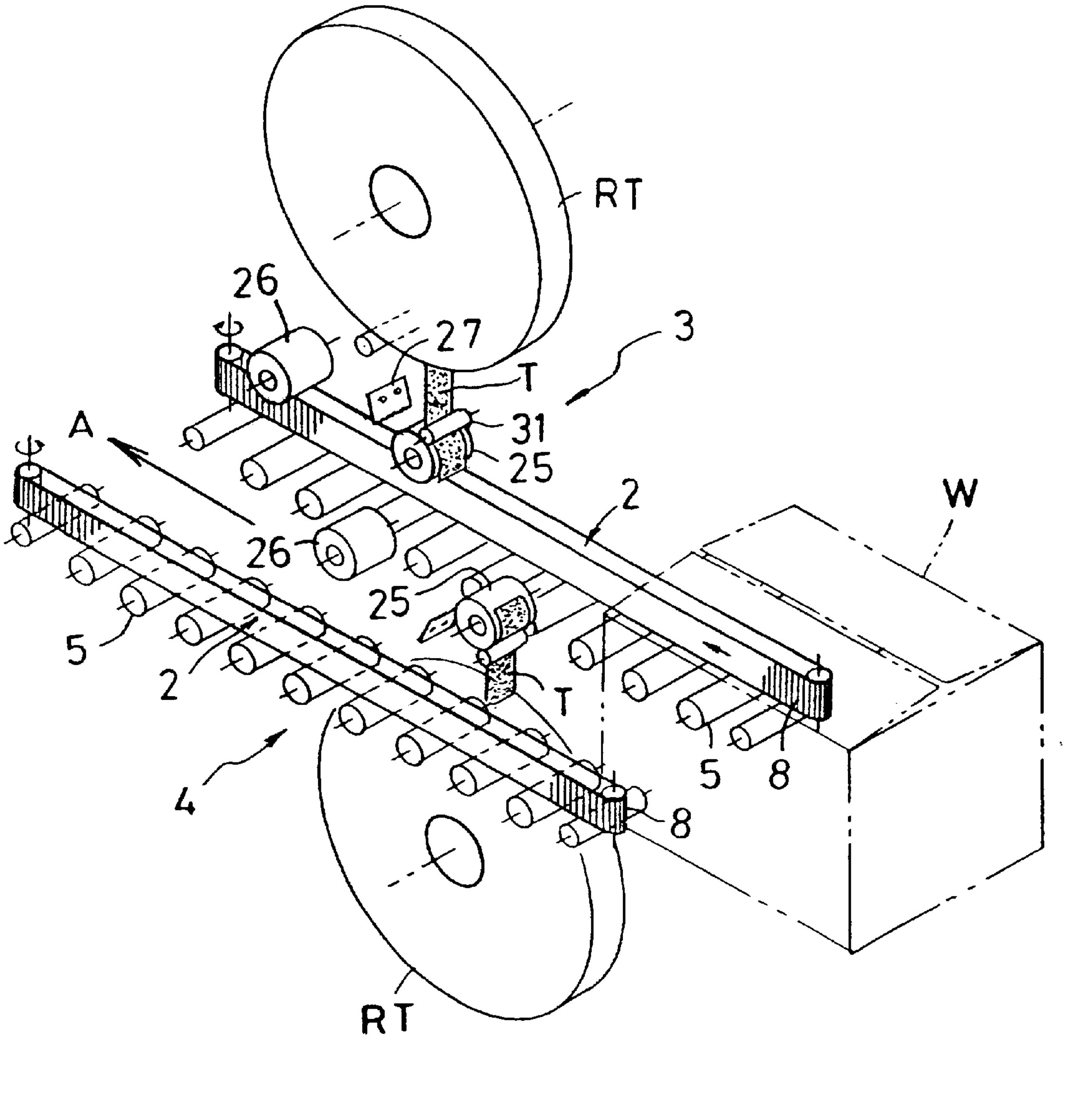
FIG. 2 is a schematic perspective view of a principal portion of the carton sealing apparatus.

Referring to FIG. 1 showing a side elevation and FIG. 2 showing a perspective view of a principal portion, the sealing apparatus is constructed for horizontally transporting cartons W acting as workpieces, and sealing the upper and lower surfaces of each carton W at the same time. Basically, the apparatus includes a manually movable base block 1, a pair of right and left transport mechanisms 2 arranged on the base block 1, and upper and lower adhesive tape applying mechanisms 3 and 4 opposed to each other across a carton transport path A.

The base block 1 has a hollow construction in plan view, and supports a plurality of transport rollers 5 arranged horizontally and forming a pair of right and left groups. The transport path A is formed above these roller groups for transporting the cartons W horizontally in the fore and aft direction. A loading roller conveyer 6 and an unloading roller conveyer 7 are connected to the upstream and downstream ends of transport path A, respectively.

The right and left transport mechanisms 2 each have transport belts 8 extending in the fore and aft direction and rotatable about vertical axes, and motors M for driving the transport belts 8 in opposite directions so that opposed surfaces thereof move downstream together. In this way, each carton W on the transport rollers 5 is transported downstream as pinched at the right and left sides between the two transport belts 8. The transport mechanisms 2 are positionally adjustable right and left to adjust a spacing therebetween to the width of carton W.

Each of the upper and lower adhesive tape applying mechanisms 3 and 4 includes an adhesive tape roll RT with adhesive tape T wound thereon, and an applicator unit 10. The lower adhesive tape applying mechanism 4 has a fixed operative position. The upper adhesive tape applying mechanism 3 is vertically adjustably supported on a post 11. Thus, the upper adhesive tape applying mechanism 3 has an operative position adjusted according to the height of carton W. The upper adhesive tape applying mechanism 3 has a pair of right and left guides 12 arranged in lower positions thereof for guiding the upper surface of carton W transported and pressing down right and left flaps of carton W.

Figure 4:
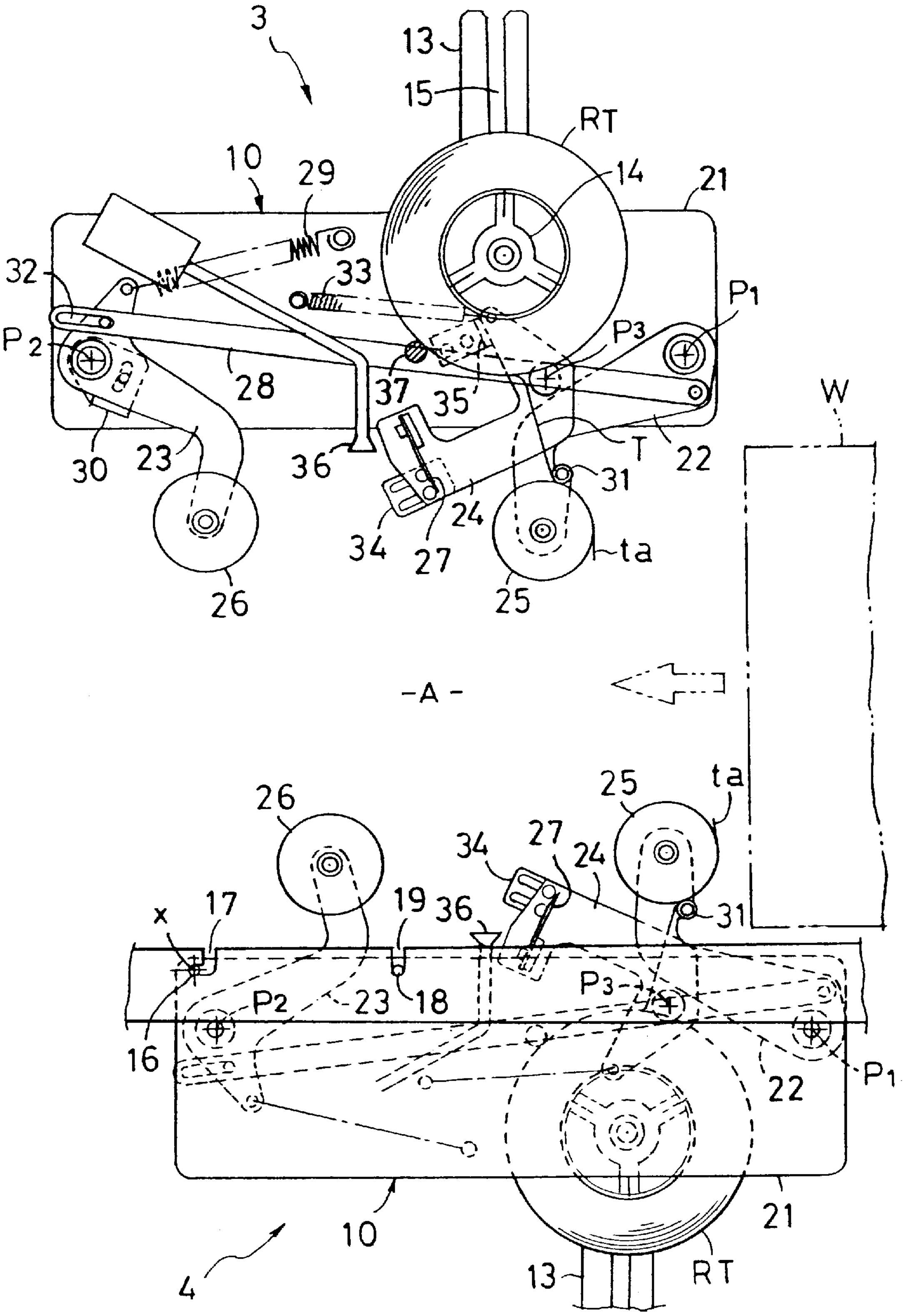
FIG. 4 is a side view of adhesive tape applying mechanisms on standby.

As shown in FIG. 4, the applicator unit 10 of each of the upper and lower adhesive tape applying mechanisms 3 and 4 has a roll support frame 13 for supporting a core element 14 which freely rotatably supports the adhesive tape roll RT and is movable up and down along a vertical guide groove 15. The core element 14 of the upper adhesive tape applying mechanism 3 is supported to be freely movable along the vertical guide groove 15 so that the adhesive tape roll RT is biased downward by gravity. On the other hand, the core element 14 of the lower adhesive tape applying mechanism 4 is biased upward along the vertical guide groove 15 by a spring not shown, to bias the adhesive tape roll RT upward.

Figure 3:
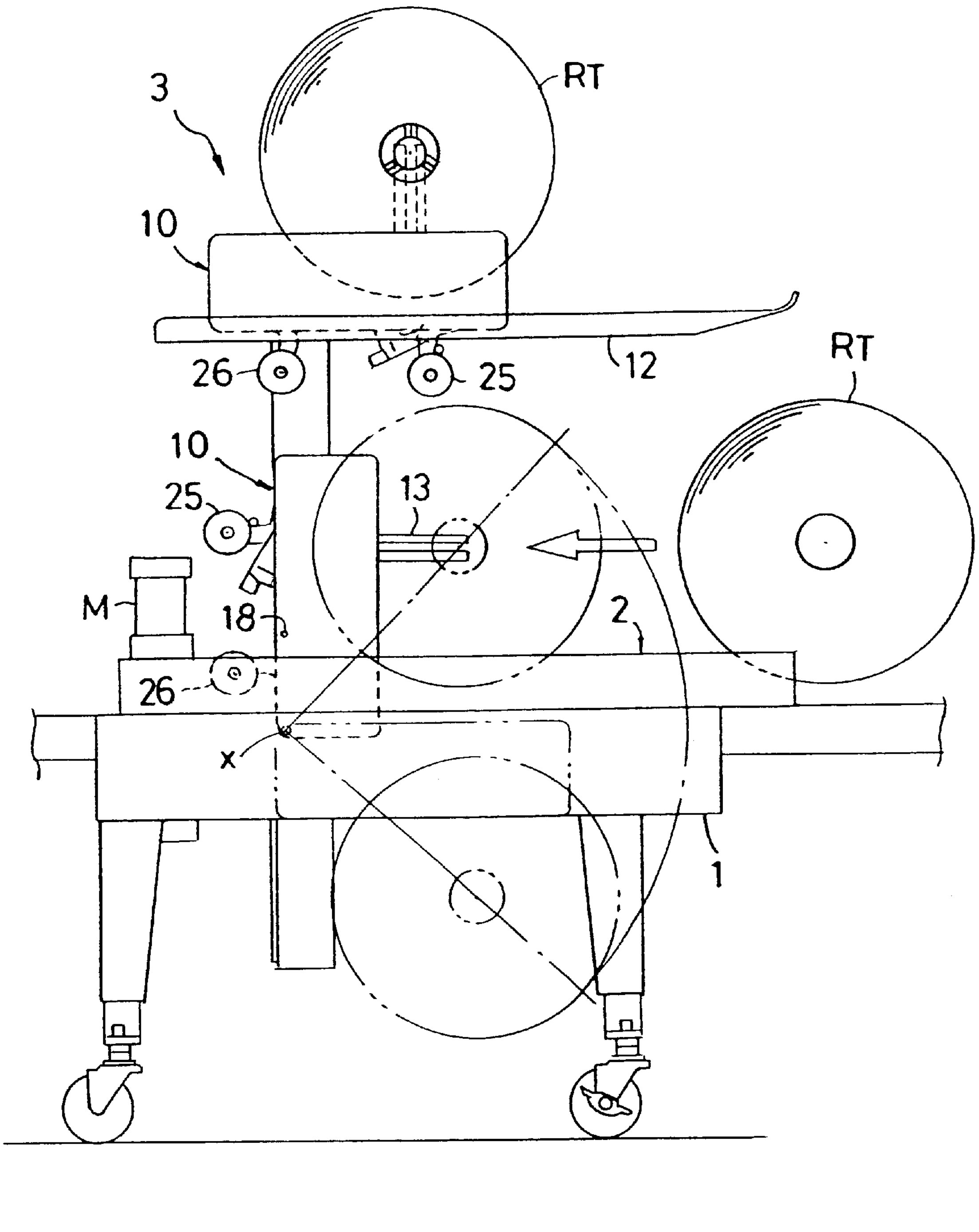
FIG. 3 is a side view showing changing of an adhesive tape roll.

The lower adhesive tape applying mechanism 4 is supported by the base block 1 to be vertically pivotable about a pivotal axis x disposed in an upper rear position of applicator unit 10. As shown in FIG. 3, the upper adhesive tape applying mechanism 3 may be moved upward to leave a large space above the base block 1. In this state, the entire lower tape applying mechanism 4 may be swung about 90° upward through a space between the groups of right and left idle rollers 5 to a tape roll changing position. Thus, the operator may change the adhesive tape roll RT of lower tape applying mechanism 4 and put the adhesive tape T in place easily by using a large space over the transport path A.

As shown in FIG. 4, the pivotal axis x is defined by a pivot pin 16 disposed at an upper rear corner of applicator unit 10 and pivot grooves 17 formed in fixed frame portions of base block 1 for receiving the pivot pin 16. The applicator unit 10 further includes an engaging pin 18 disposed forwardly of the pivotal axis x for entering engaging grooves 19 formed in the base block 1. In this way, the adhesive tape applying mechanism 4 is correctly maintained in a predetermined tape applying position below the transport path A.

The pivot grooves 17 are hook-shaped, opening upward and curved rearward. The engaging grooves 19 extend vertically and open upward. That is, by placing the pivotal pin 16 in the deep ends of the hooked pivot grooves 17 and by inserting the engaging pin 18 into the engaging grooves 19, the pivotal pin 16 is prevented from moving backward and forward or up and down, thereby setting the pivotal axis x in place.

The pivot pin 16 may be removed upward from the hooked pivot grooves 17 by slightly raising the applicator unit 10 to withdraw the engaging pin 18 upward from the engaging grooves 19. As a result, the entire lower tape applying mechanism 4 may be detached from the apparatus.

The applicator units 10 of upper and lower adhesive tape applying mechanisms 3 and 4 have an identical construction, the only difference being vertically reversed operative postures thereof. The construction and functions will be described hereinafter by referring to the upper applicator unit 10.

As shown in FIG. 4, the applicator unit 10 includes a unit frame 21 having swing arms 22, 23 and 24 attached to front, rear and intermediate positions thereof to be vertically oscillatable about pivotal points P1, P2 and P3, respectively. The front and rear swing arms 22 and 23 have an applicator roller 25 and a press roller 26 freely rotatably attached to free ends thereof, respectively. The intermediate swing arm 24 has a replaceable tape cutter 27 attached to a free end thereof, with a cutting edge directed downward.

The front and rear swing arms 22 and 23 are operatively interconnected by an interlocking link 28 to be swingable in opposite directions to move vertically together. The swing arms 22 and 23 are biased downward into the transport path A of carton W by a spring 29 extending between the unit frame 21 and the swing arm 23 of press roller 26. The swing arm 23 has a lower limit of swinging movement set through contact with a stopper 30 positionally adjustable about the pivotal point P2.

The swing arm 22 includes a guide roller 31 for guiding the adhesive tape T drawn from the adhesive tape roll RT and winding the adhesive tape T around the applicator roller 25. The leading end ta of adhesive tape T is guided to and held on a front surface of applicator roller 25, with an adhesive surface facing upstream of the transport path A (i.e. rightward in FIG. 4).

The rear end of interlocking link 28 and the swing arm 23 are operatively interconnected, with play provided by a slot 32 formed in the rear end of interlocking link 28. When the swing arm 23 is in contact with and supported by the stopper 30, the spring 29 is at or near its free length.

The swing arm 24 also is biased downward by a spring 33 extending between the swing arm 24 and unit frame 21. The swing arm 24 includes a contact element 34 attached to the free end thereof to be adjustable of extension and retraction to project into a moving track of carton W. The swing arm 24 has a lower limit of swinging movement set through contact with a stopper 35.

The applicator unit 3 further includes a suction nozzle 36 disposed at a tape applying height between the rearward press roller 26 and the tape cutter 27. The suction nozzle 36 is shaped divergent and connected to a vacuum device not shown.

An adhesive tape applying operation will be described next.

(a) In an initial state where a carton W has not arrived at the apparatus, as shown in FIG. 4, the applicator roller 25, press roller 26 and tape cutter 27 supporting the adhesive tape T are on standby in positions projecting to the transport path A of carton W, respectively. The adhesive tape roll RT biased downward by gravity is received at an outer periphery thereof by a stopper 37 formed on the unit frame 21, to stay away from the applicator roller 25.

(b) When the carton W moves into contact with the applicator roller 25, the applicator roller 25 retracts upward while applying the leading end ta of adhesive tape T to the front surface of carton W. With the upward pivotal movement of applicator roller 25, the interlocking link 28 is pushed rearward to retract the rearward press roller 26 also.

In the standby state, the spring 29 is at or near its free length. Thus, at an initial stage of tape application to the front surface of carton W, the spring 29 does not apply a strong force to the swing arm 23 of press roller 26. The applicator roller 25 does not press the front surface of carton W with a strong reactive force. Even if the carton W is thin and not very rigid, the front surface of carton W is free from deformation by an excessive force applied by the applicator roller 25.

Figure 5:
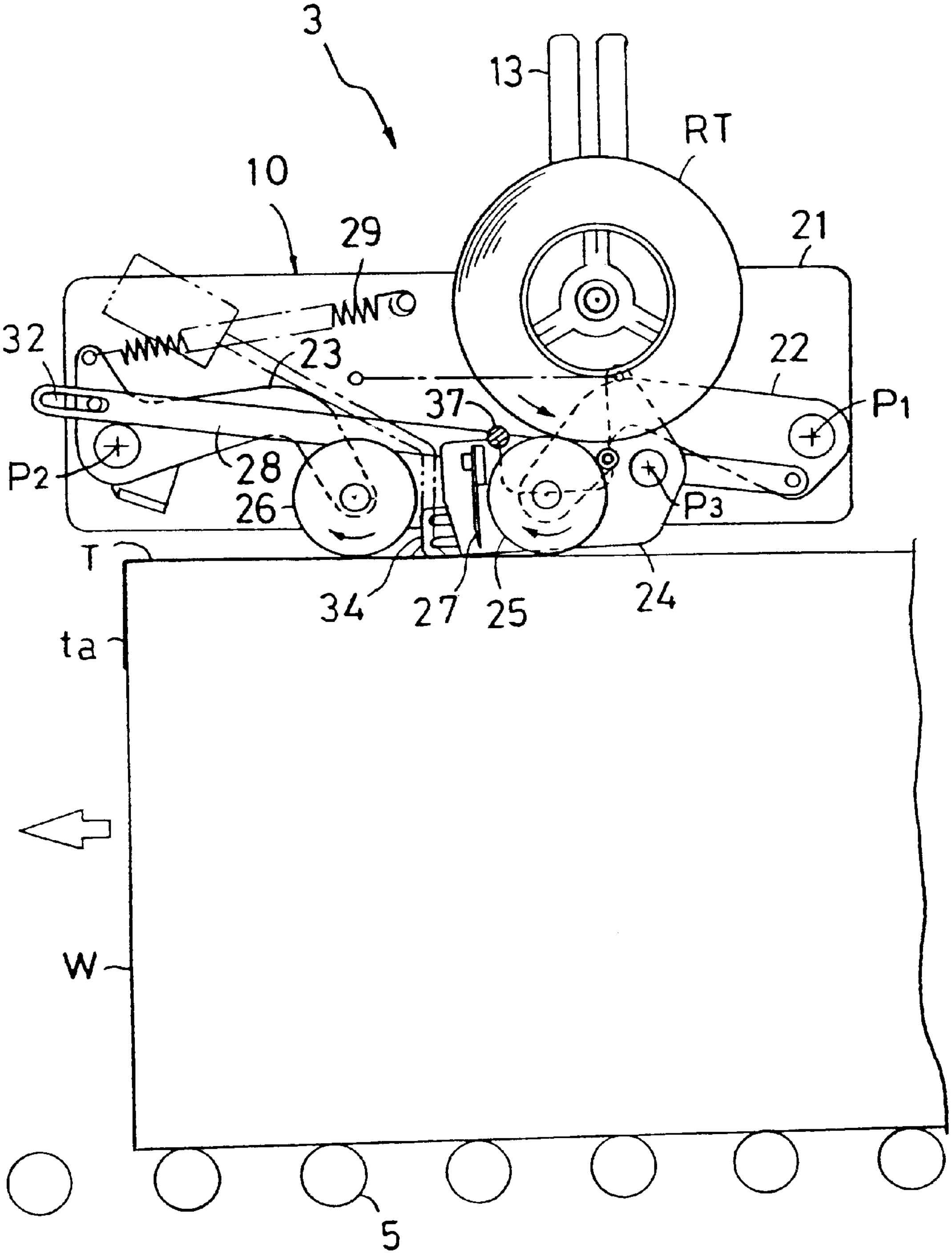
FIG. 5 is a side view of one of the adhesive tape applying mechanisms in a tape applying operation.

(c) As the carton W moves further forward, as shown in FIG. 5, the applicator roller 25 rides on the carton W and applies the adhesive tape T along butt edges of right and left outer flaps. The press roller 26 riding on the carton W is biased downward by the spring 29 to press down the adhesive tape T applied by the applicator roller 25. Consequently, the adhesive tape T is pasted to the upper surface of carton W with a sufficient pressing force.

With the contact element 34 at the distal end of swing arm 24 contacting the carton W, the swing arm 24 is pushed up against the force of spring 33, thereby retracting the tape cutter 27 above the adhesive tape T. During the process of applying the tape T to the upper surface of carton W, as shown in FIG. 5, the play provided by the slot 32 allows only the swing arm 22 of applicator roller 25 to oscillate vertically free from the force of spring 29. Thus, even where the upper surface of carton W is warped to form minor dents, the applicator roller 25 will freely follow the dented surface to apply the adhesive tape T tight to the surface.

In this adhesive tape applying process, the applicator roller 25 raised contacts a downwardly facing outer peripheral surface of adhesive tape roll RT, and raises the adhesive tape roll RT off the stopper 37. As a result, the adhesive tape T drawn is separated from the adhesive tape roll RT at a point of contact between the adhesive tape roll RT and applicator roller 25, and is wound straight around the applicator roller 25 to be guided to a position of application. With the forward movement of carton W, the applicator roller 25 rotates clockwise in FIG. 5. The rotation of applicator roller 25 is transmitted directly to the outer peripheral surface of adhesive tape roll RT. Thus, the adhesive tape T is drawn from the adhesive tape roll RT rotating at the same peripheral speed as the applicator roller 25.

Figure 6:
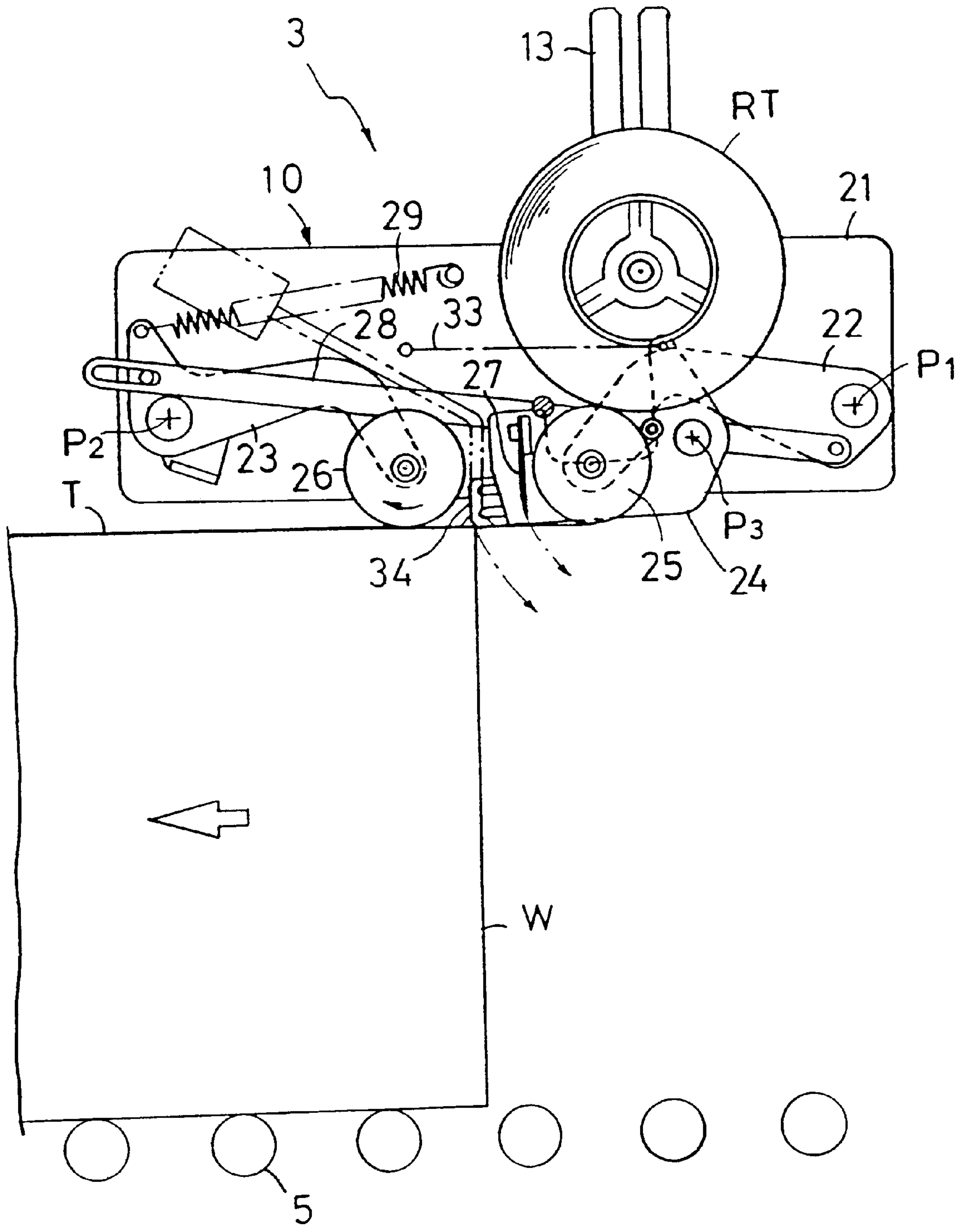
FIG. 6 is another side view of one of the adhesive tape applying mechanisms in the tape applying operation.

(d) As the carton W moves further forward, as shown in FIG. 6, the applicator roller 25 comes off the carton W but is retained in the raised position by tension of the adhesive tape T while the contact element 34 remains on the carton W. When the contact element 34 comes off the rear end of carton W, the tape cutter 27 is lowered by the spring 33 to cut the adhesive tape T, and the applicator roller 25 is lowered to the initial, standby position. A tape cutting position may be adjusted by varying a projecting length of the contact element 34 on the swing arm 24.

Figure 7:
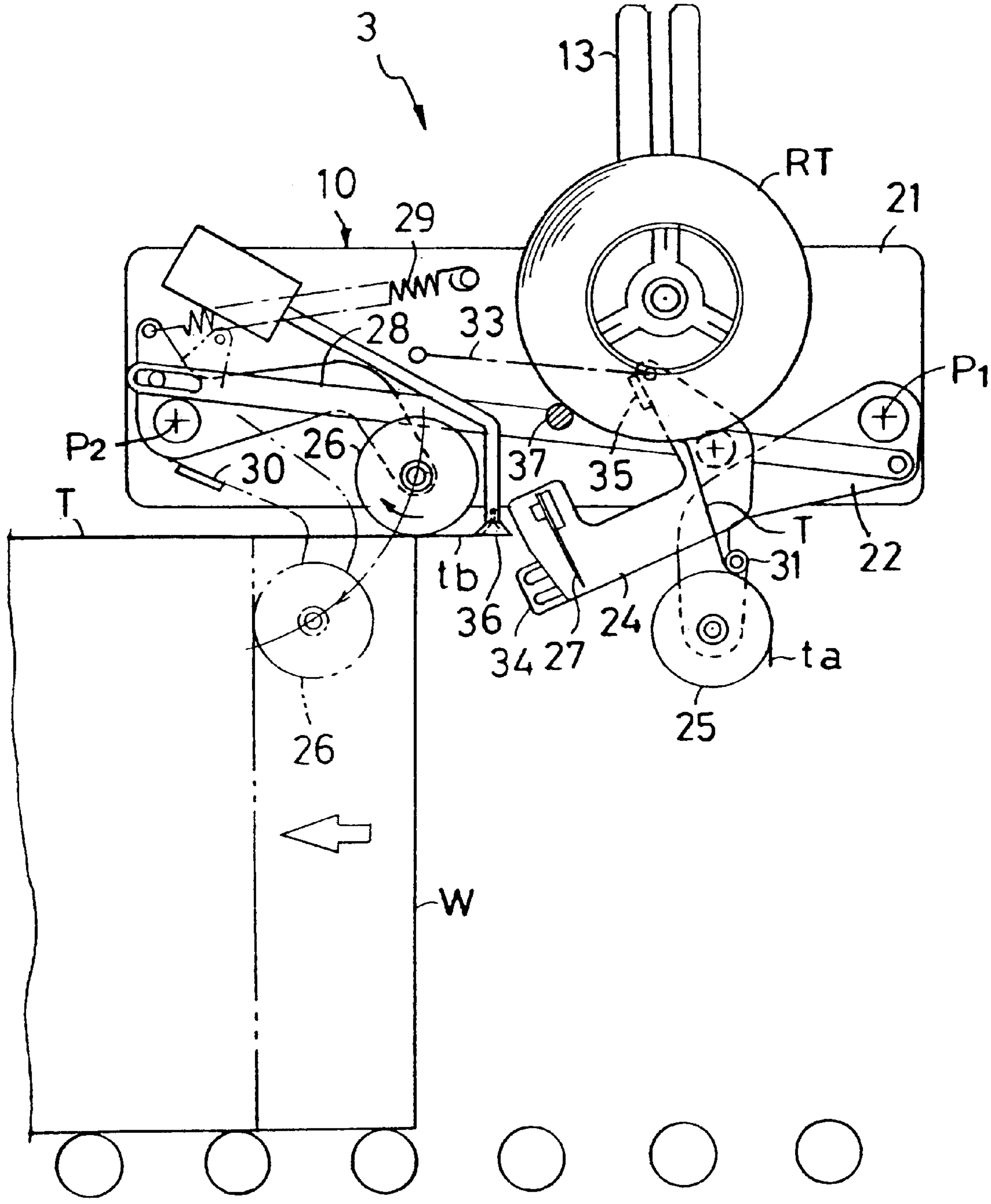
FIG. 7 is a side view of one of the adhesive tape applying mechanisms immediately before ending the tape applying operation.
Figure 8:
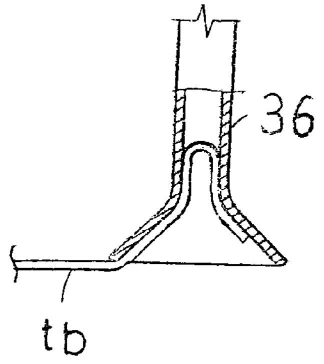
FIG. 8 is a side view in vertical section of a suction nozzle in operation.

(e) After the tape is cut, a descent of swing arm 24 is detected by a sensor not shown, whereupon an operation of suction nozzle 35 is started. As shown in FIG. 7, with a rear end region tb of adhesive tape T suction-supported by the suction nozzle 35, the press roller 26 approaches the rear end of carton W. In this case, the suction nozzle 35 acts on a rear region slightly short of the cut edge of tape T. Thus, as shown in FIG. 8, the rear end region tb of adhesive tape T is drawn into the suction nozzle 35 as folded with the adhesive surface tucked in.

Figure 9:
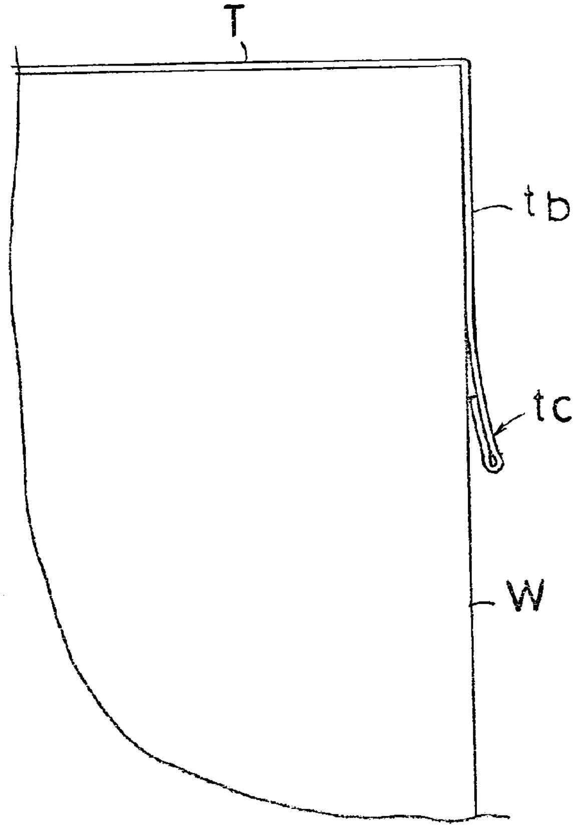
FIG. 9 is an enlarged side view of a rear end portion of an adhesive tape applied.
Figure 10:
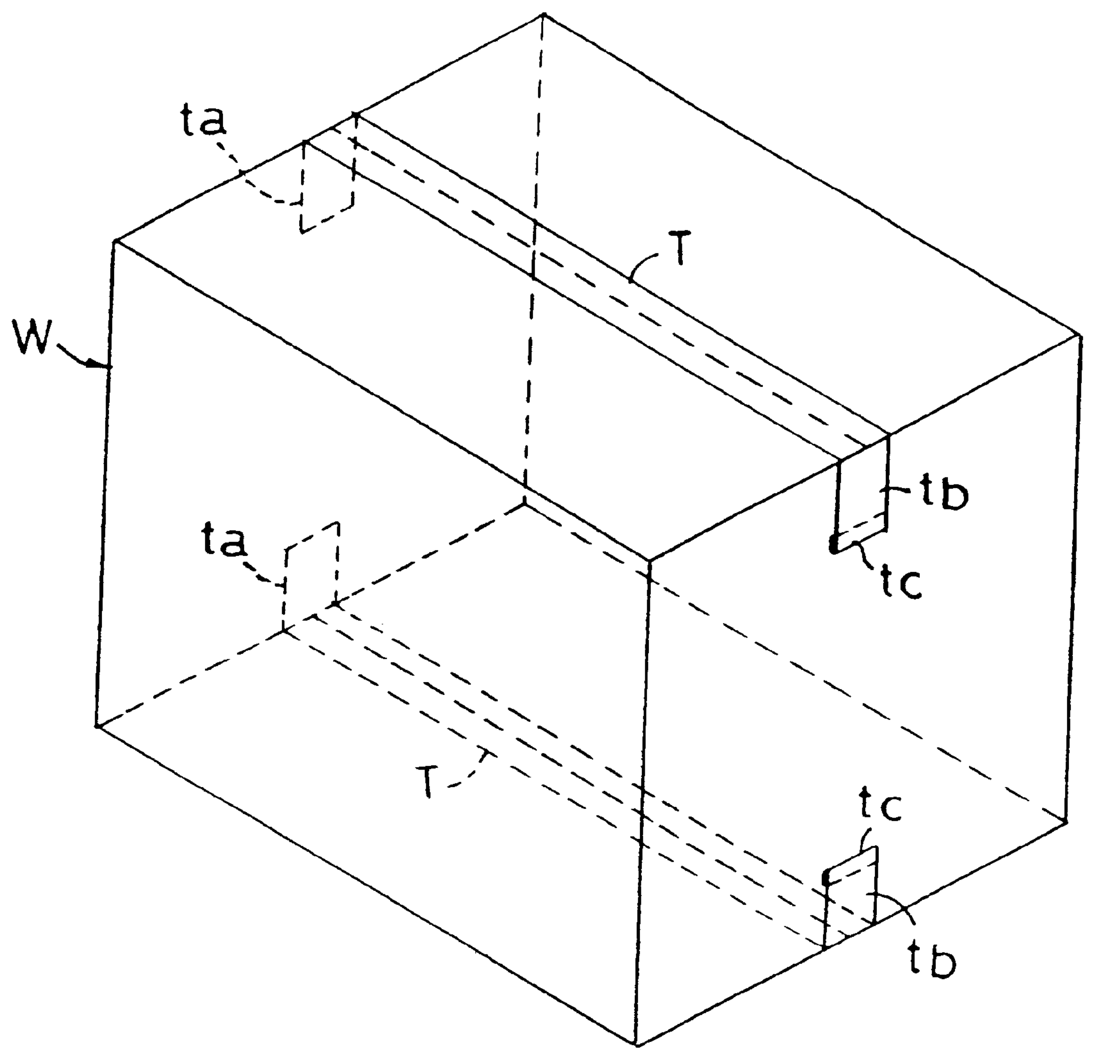
FIG. 10 is a perspective view of a sealed carton.
Figure 11:
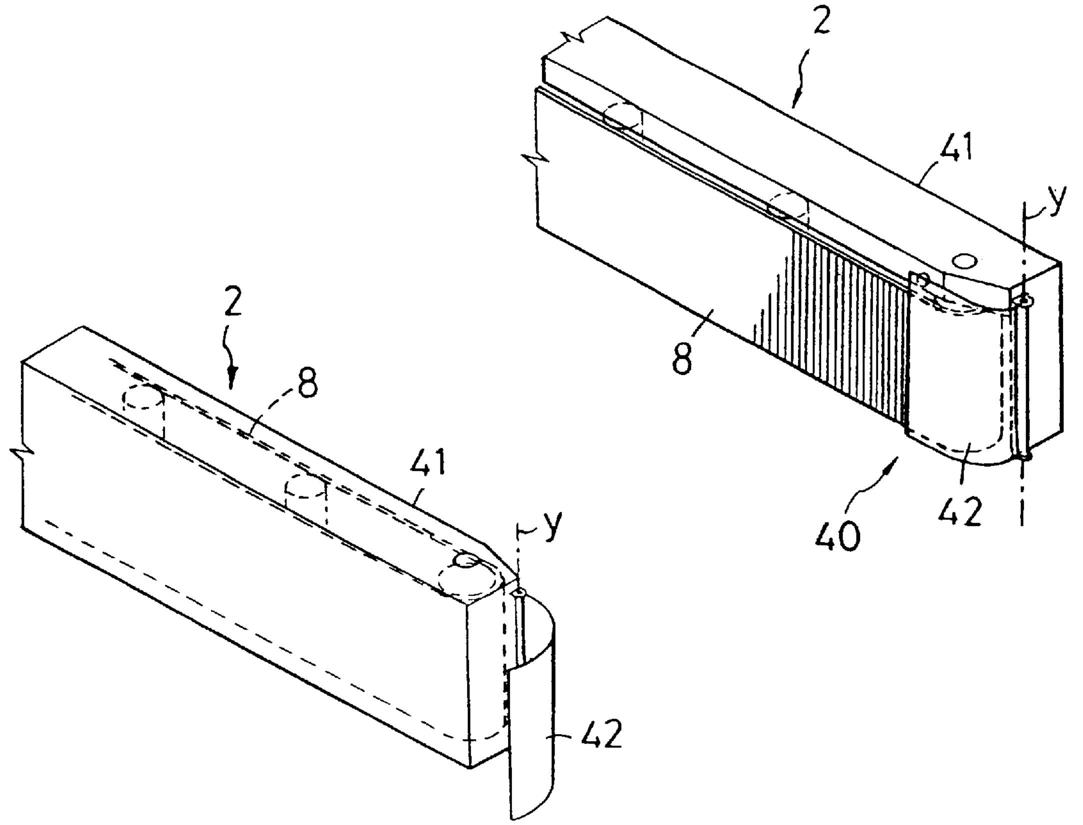
FIG. 11 is a perspective view of carton distortion correcting mechanisms.
Figure 12:
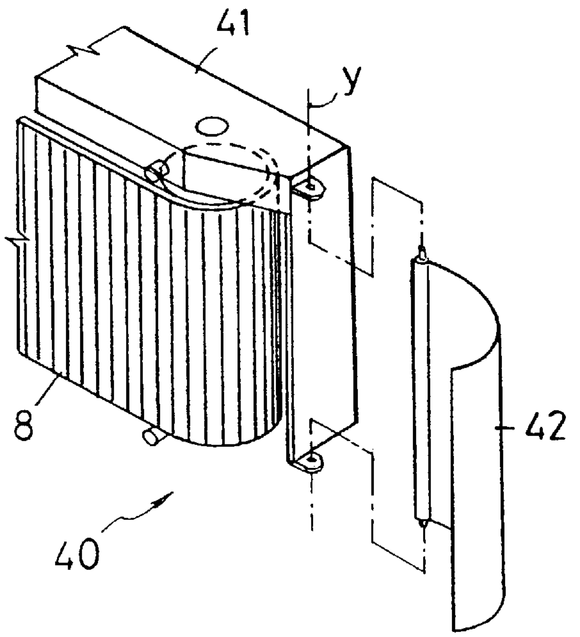
FIG. 12 is an exploded perspective view of one of the distortion correcting mechanisms.

(f) As the carton W advances in this state, the press roller 27 biased downward, as shown in a phantom line in FIG. 7, moves from the rear end down the rear surface of carton W, pasting the rear end region tb of adhesive tape T around the rear end corner and to the rear surface of carton W. The tape-sealed carton W (FIG. 10) is delivered from the rear end of transport path A. As shown in FIG. 9, a fold tc formed at the extreme end of rear end region tb of adhesive tape T is not pasted to the carton W, thereby to serve as a catch for tape peeling when opening the carton W.

(g) The above step completes one adhesive tape applying operation, whereupon the initial state is reinstated to be ready for handling a next carton. The lower tape applying mechanism 4 is disposed slightly upstream of the upper tape applying mechanism 3 with respect to the transport path A. Thus, the lower tape applying mechanism 4 performs the same process as described above slightly earlier than the upper tape applying mechanism 3.

The carton W introduced into the transport path A to undergo the above tape applying operation may have distorted surfaces attributable to a peculiar way of folding a board material to form the carton W. The sealing apparatus includes distortion correcting mechanisms 40 disposed at upstream ends of the transport mechanisms 2 for automatically correcting such distortions. FIGS. 11 through 14 show details of the distortion correcting mechanisms 40.

Figure 13:
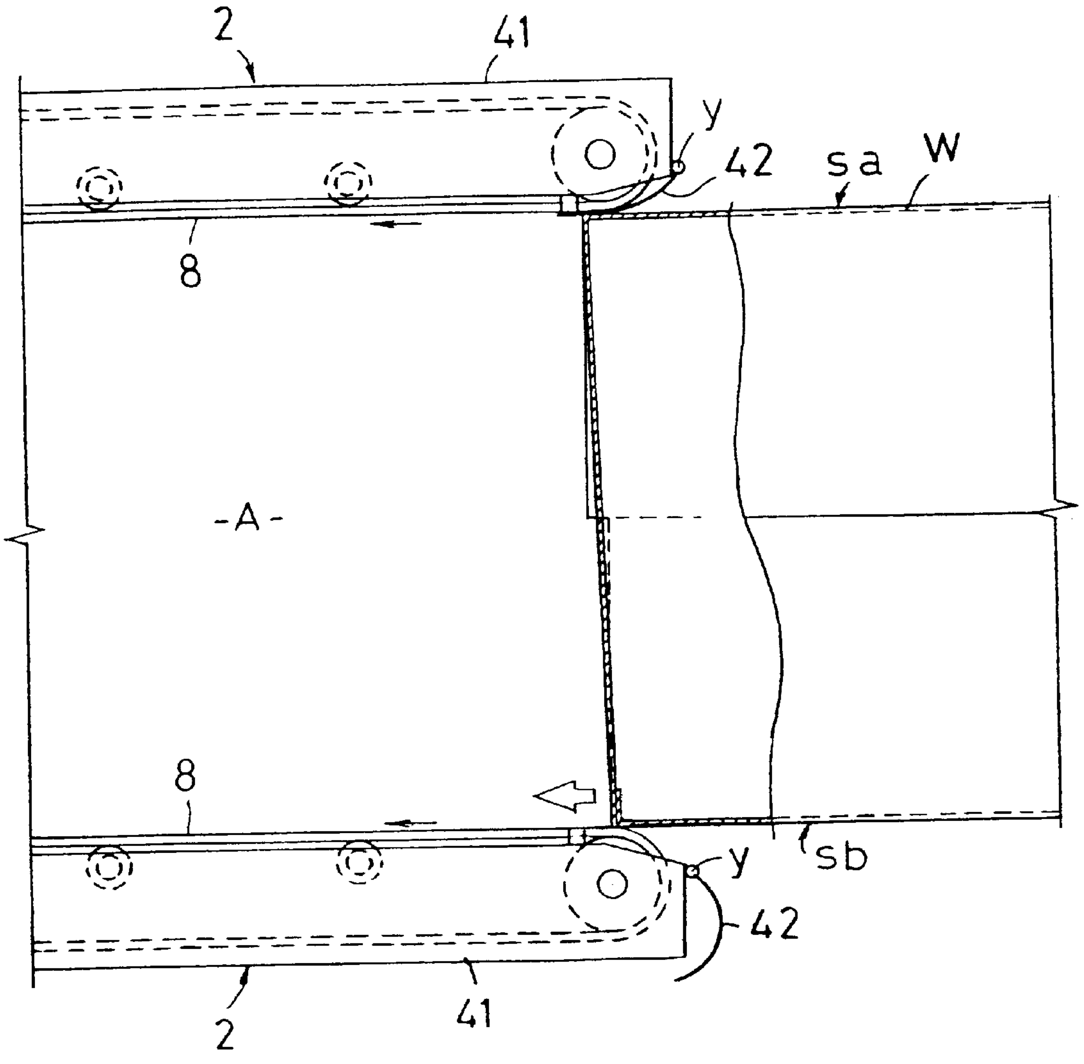
FIG. 13 is a plan view of the distortion correcting mechanisms in operation.

As seen, each of the right and left transport mechanisms 2 includes a cover case 41 for covering outer and upper areas of the transport belt 8, and a contact restraining member 42 formed of thin resin sheet and attached to the forward end of cover case 41 to be oscillatable about a vertical axis y. As shown in FIG. 13, one of the contact restraining members 42 on the side (upper side in FIG. 13) where a carton W is distorted forwardly in the direction of transport is placed in a position protruding to the transport path A beforehand. In this position, the contact restraining member 42 covers the upstream end of transport belt 8 on this side. The other contact restraining member 42 is turned away from the transport path A.

The contact restraining members 42 set to the above positions produce a difference in transporting capability at the upstream end between the right and left transport mechanisms 2. In the example shown in FIG. 13, the contact restraining member 42 prevents the transporting force of transport belt 8 from acting on the right side surface sa distorted forward in the direction of transport. The left side surface sb instantly receives the transporting force of transport belt 8. The carton W is transported only by the transporting force applied to the left side surface sb. The contact-restrained right side surface sa of carton W slides along the surface of contact restraining member 42. As a result, the left side surface sb receiving the transporting force precedes the contact-restrained right side surface sa, whereby the initial distortion is gradually corrected.

Figure 14:
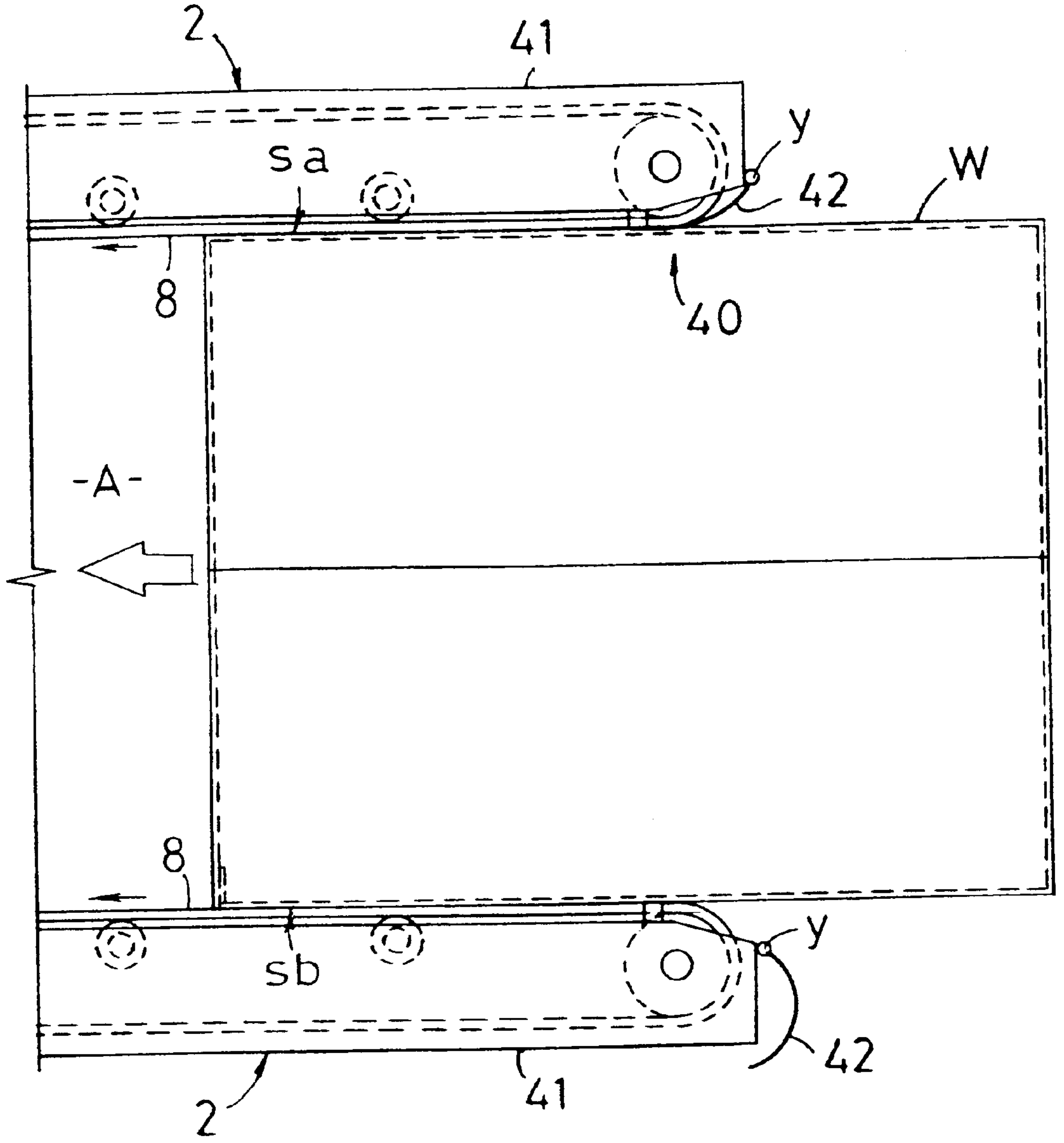
FIG. 14 is a plan view showing a distortion-corrected carton being transported.

With the initial distortion corrected and the front surface of carton W placed at right angles to the direction of transport, the carton W has a maximum width at the front surface perpendicular to the direction of transport. In this state, the carton W receives a maximum transporting force from the two transport belts 8. A side surface of the carton W preceding the other tends to move away and receive a reduced transporting force from the transport belt 8. Thus, after the front surface of carton W is placed at right angles to the direction of transport, the carton W will not become distorted at the opposite side; the left side surface sb to which the transporting force has been applied will not precede the right side surface sa. As shown in FIG. 14, the carton W will be transported in normal posture, with the distortion eliminated, to the adhesive tape applying position by even transporting forces applied to the right and left sides.

The direction in which the carton W is distorted is determined by a box-making method. Where cartons W of the same type are introduced successively, only one of the right and left contact restraining members 42 may be placed in the operative position to correct the distorted and preceding side surface of each carton W.

This invention may be implemented in the following modified forms besides the foregoing embodiment:

(1) The elements defining the pivotal axis x for vertically pivotably supporting the lower adhesive tape applying mechanism 4 may be reversed from the arrangement in the foregoing embodiment. That is, the pivot grooves 17 and engaging grooves 19 are formed in the applicator unit 10, and the pivot pin 16 and engaging pin 18 on the base block 1.

(2) It will be convenient to provide an auto lock mechanism for automatically locking the lower adhesive tape applying mechanism 4 to the tape roll changing position. Such a lock mechanism may be operable, for example, when the lower adhesive tape applying mechanism 4 is swung up to the tape roll changing position and a gas damper described hereinafter is extended.

(3) The construction may be simplified by pivotally connecting the unit frame 21 of lower adhesive tape applying mechanism 4 to the base block 1 through a support axis defining an inseparable pivotal axis x. In this case, the unit frame 21 may be contacted from below by a stopper or the like formed on the base block 1 to be set to the tape applying position.

(4) In the foregoing embodiment, the lower adhesive tape applying mechanism 4 is vertically pivotable about one point between the tape applying position below the transport path A and the tape roll changing position above the transport path A. In addition, the lower adhesive tape applying mechanism 4 may be adapted vertically pivotable while being shiftable in the fore and aft direction by using a link mechanism or slide mechanism. With this construction, the lower adhesive tape applying mechanism 4 may be swung upward after being shifted forward or backward to be clear of the upper adhesive tape applying mechanism 3. Even where the upper adhesive tape applying mechanism 3 is set to a relatively low position, the lower adhesive tape applying mechanism 4 may be moved to the adhesive tape roll changing position without retracting the upper adhesive tape applying mechanism 3 upward. After the adhesive tape roll is changed, the upper adhesive tape applying mechanism 3 need not be adjusted in height again.

Second Embodiment

A different embodiment in which this invention is applied to a carton sealing apparatus will be described hereinafter with reference to the drawings.

Figure 15:
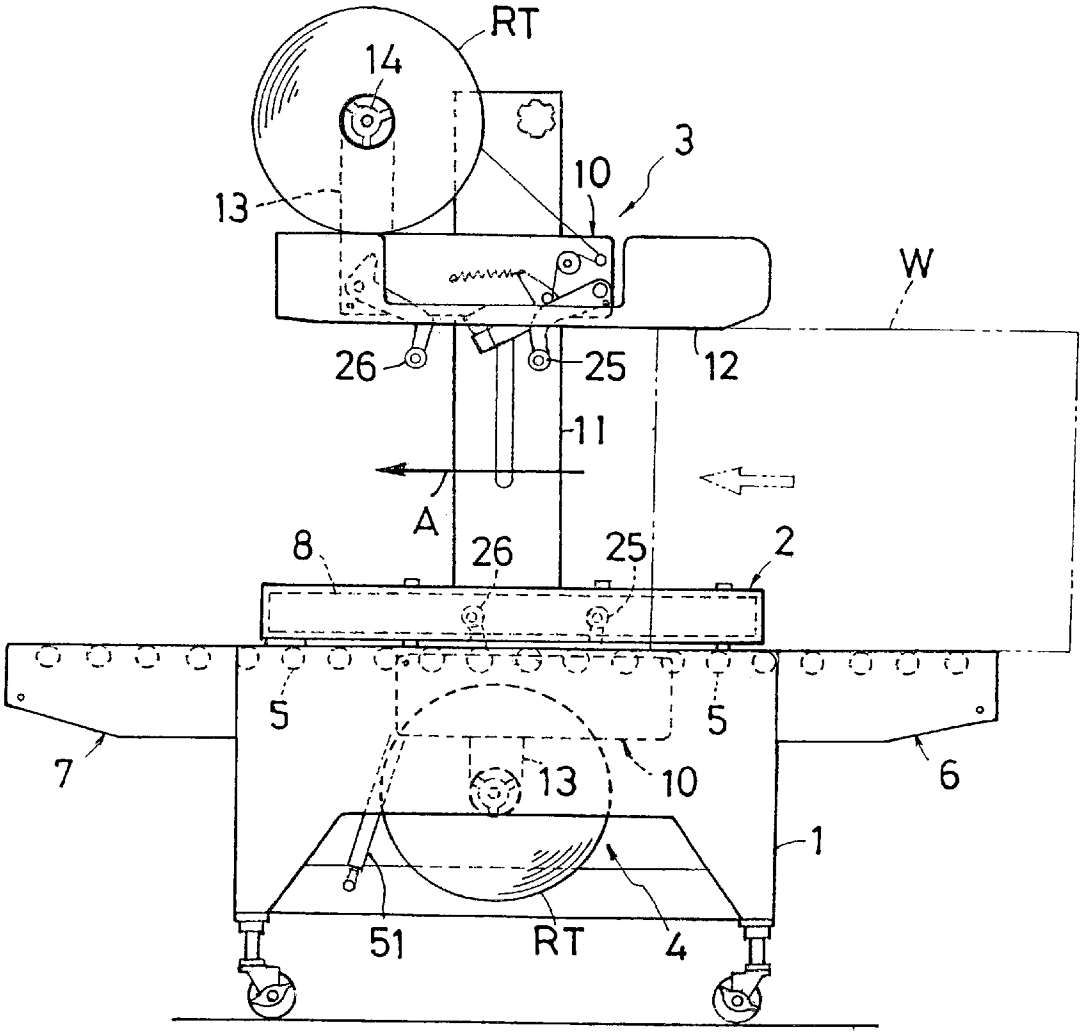
FIG. 15 is a side view of a carton sealing apparatus in a second embodiment of this invention.
Figure 16:
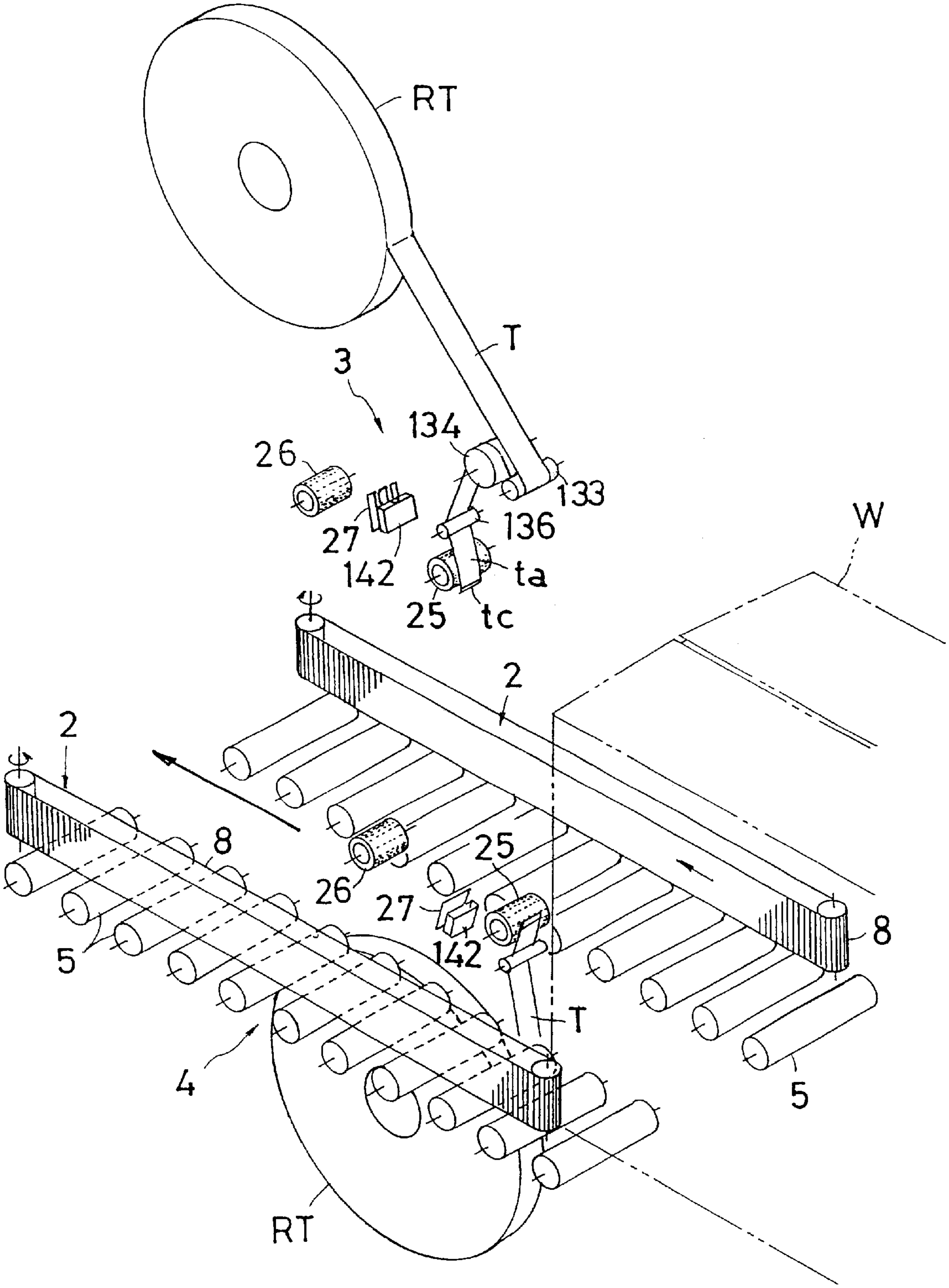
FIG. 16 is a schematic perspective view of a principal portion of the carton sealing apparatus in the second embodiment.
Figure 17:
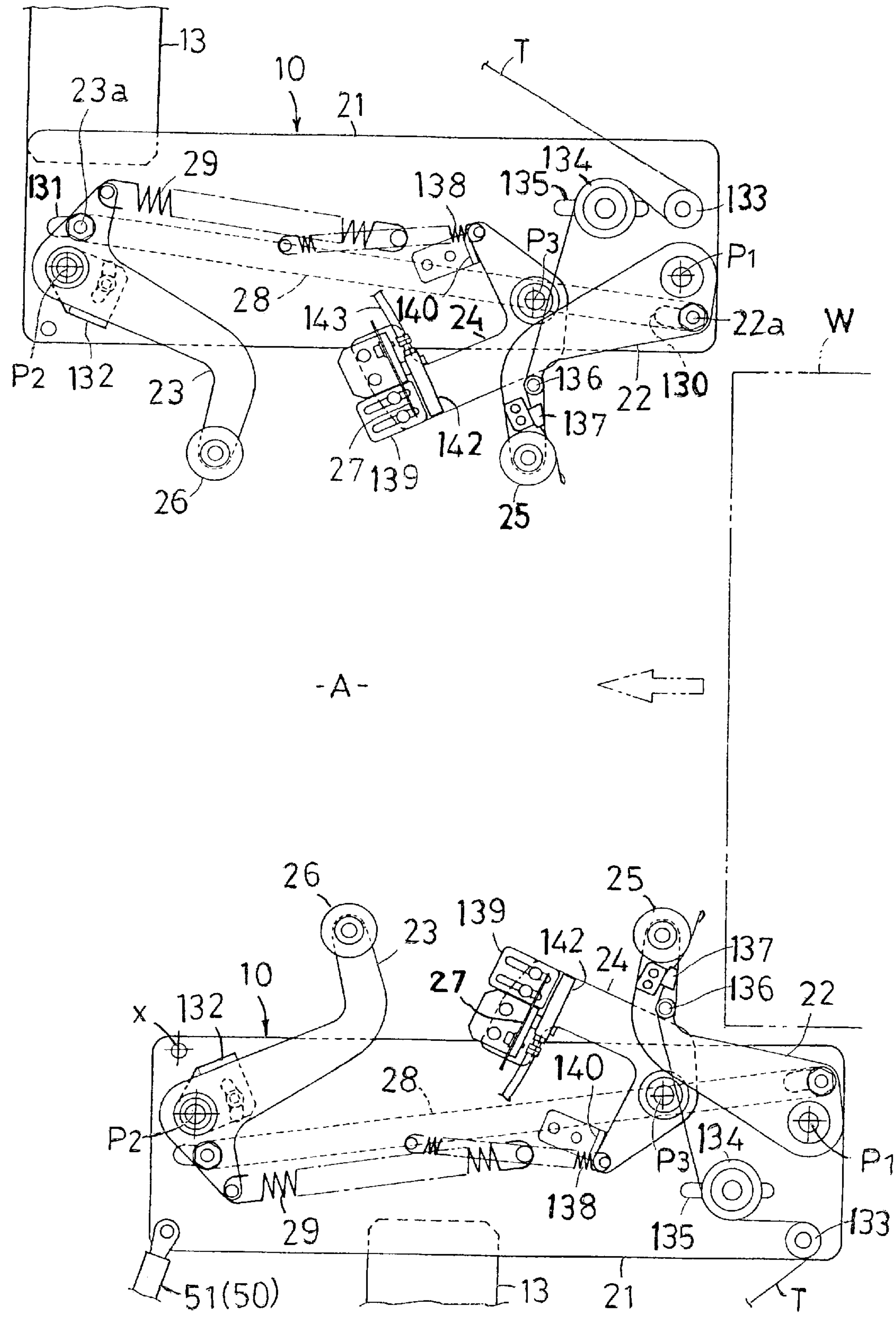
FIG. 17 is a side view of upper and lower adhesive tape applying mechanisms on standby.
Figure 18:
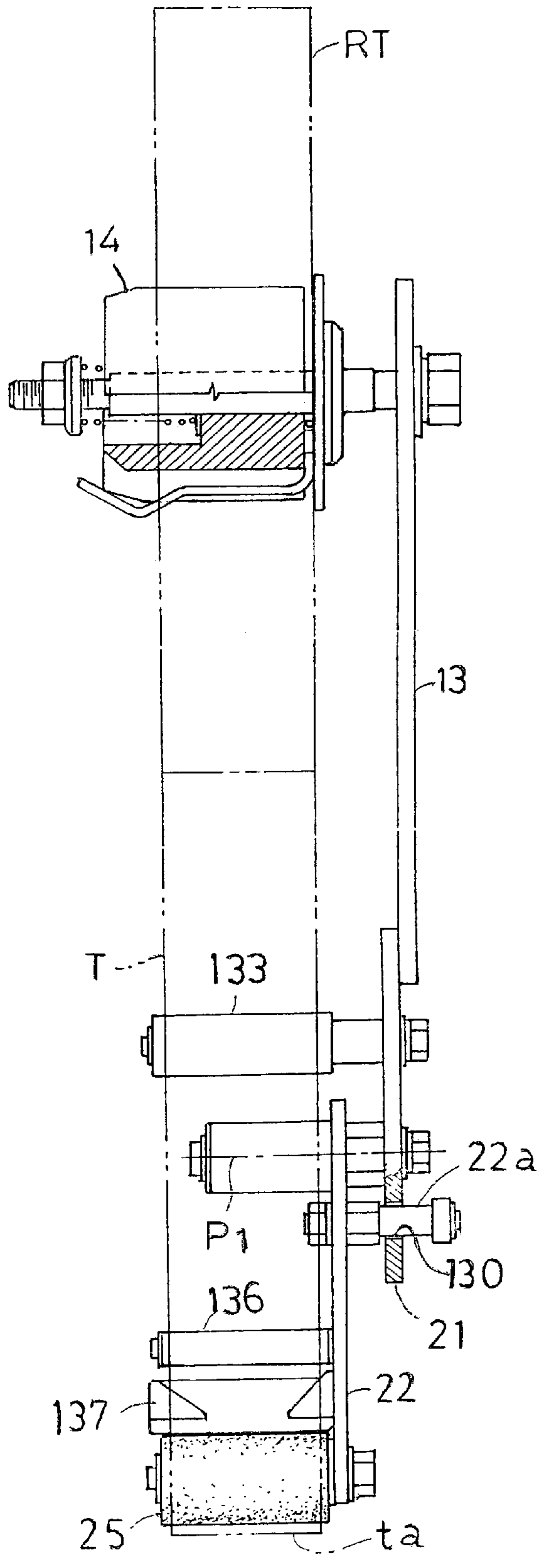
FIG. 18 is an overall front view of the adhesive tape applying mechanisms.
Figure 19A:
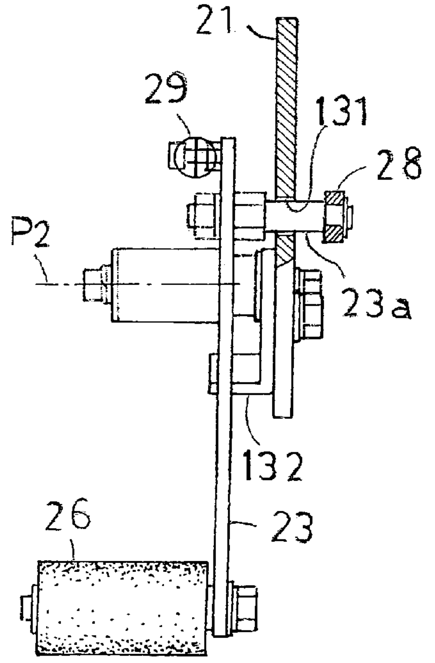
FIG. 19A is a fragmentary front view of one of the adhesive tape applying mechanisms showing a press roller and adjacent elements.
Figure 19B:
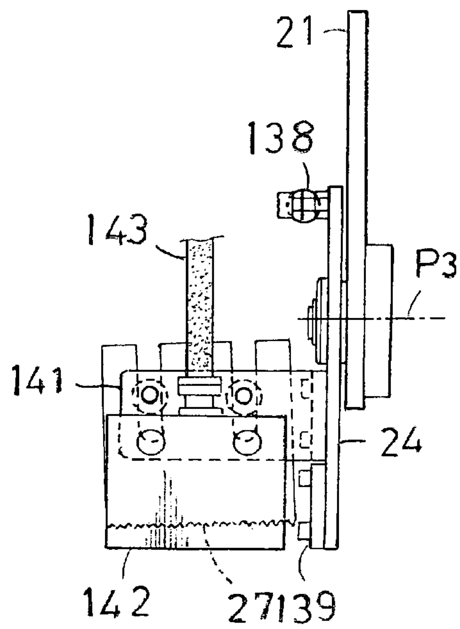
FIG. 19B is a fragmentary front view of one of the adhesive tape applying mechanisms showing a suction nozzle and adjacent elements.
Figure 20:
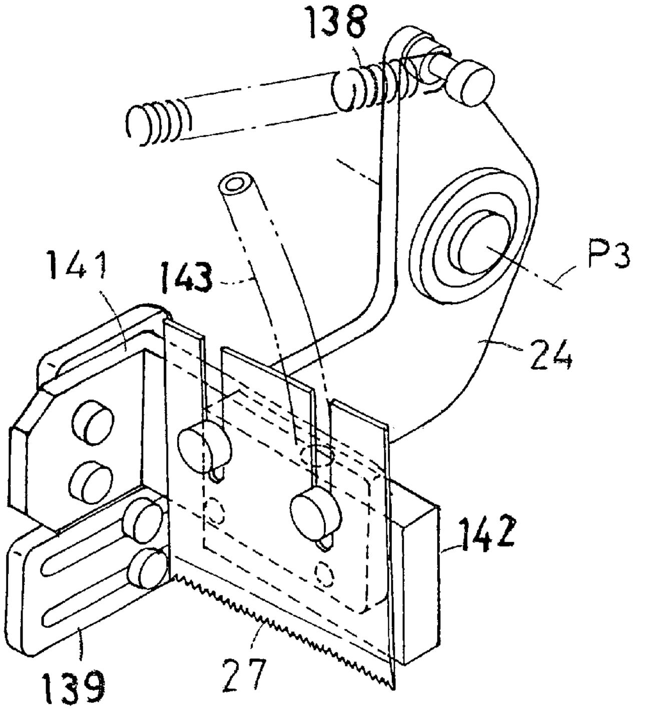
FIG. 20 is a perspective view of a structure for mounting a tape cutter and the suction nozzle.

FIG. 15 is a side elevation of the carton sealing apparatus. FIG. 16 is a schematic perspective view of a principal portion of the apparatus. FIG. 17 is a side view of upper and lower adhesive tape applying mechanisms on standby. FIG. 18 is an overall front view of the adhesive tape applying mechanisms. FIG. 19A is a fragmentary front view of one of the adhesive tape applying mechanisms showing a press roller and adjacent elements. FIG. 19B is a fragmentary front view of one of the adhesive tape applying mechanisms showing a suction nozzle and adjacent elements. FIG. 20 is a perspective view of a structure for mounting a tape cutter and the suction nozzle.

As shown in FIGS. 15 and 16, the sealing apparatus is constructed for horizontally transporting cartons W acting as workpieces, and sealing the upper and lower surfaces of each carton W at the same time. Basically, the apparatus includes a manually movable base block 1, a pair of right and left transport mechanisms 2 arranged on the base block 1, and upper and lower adhesive tape applying mechanisms 3 and 4 opposed to each other across a carton transport path A.

The base block 1 has a hollow construction in plan view, and supports a plurality of transport rollers 5 arranged horizontally and forming a pair of right and left groups. The transport path A is formed above these roller groups for transporting the cartons W horizontally in the fore and aft direction. A loading roller conveyer 6 and an unloading roller conveyer 7 are connected to the upstream and downstream ends of transport path A, respectively.

The right and left transport mechanisms 2 each have transport belts 8 extending in the fore and aft direction and rotatable about vertical axes, and motors not shown for driving the transport belts 8 in opposite directions so that opposed surfaces thereof move downstream together. In this way, each carton W on the transport rollers 5 is transported downstream as pinched at the right and left sides between the two transport belts 8. The transport mechanisms 2 are positionally adjustable right and left to adjust a spacing therebetween to the width of carton W.

As shown in FIG. 15, each of the upper and lower adhesive tape applying mechanisms 3 and 4 includes an adhesive tape roll RT with adhesive tape T wound thereon, and an applicator unit 10. The lower adhesive tape applying mechanism 4 has a fixed operative height. The upper adhesive tape applying mechanism 3 is vertically adjustably supported on a post 11. Thus, the upper adhesive tape applying mechanism 3 has an operative height adjusted according to the height of carton W. The upper adhesive tape applying mechanism 3 has a pair of right and left guides 12 arranged in lower positions thereof for guiding the upper surface of carton W transported and pressing down right and left flaps of carton W. The applicator unit 10 of each of the upper and lower adhesive tape applying mechanisms 3 and 4 has a roll support frame 13 for supporting a core element 14 mounted at an end thereof to be rotatable with an appropriate resistance. The adhesive tape roll RT is removably mounted on the core element 14.

The applicator units 10 of upper and lower adhesive tape applying mechanisms 3 and 4 have an identical construction, the only difference being vertically reversed operative postures thereof. The construction and functions will be described hereinafter by referring to the upper applicator unit 10.

Referring to FIGS. 17 through 19, the applicator unit 10 includes a unit frame 21 having swing arms 22, 23 and 24 attached to front, rear and intermediate positions thereof to be vertically oscillatable about pivotal points P1, P2 and P3, respectively. The front and rear swing arms 22 and 23 have an applicator roller 25 and a press roller 26 freely rotatably attached to free ends thereof, respectively. The intermediate swing arm 24 has a tape cutter 27 attached to a free end thereof, with a cutting edge directed downward.

The front and rear swing arms 22 and 23 are operatively interconnected by an interlocking link 28 to be swingable in opposite directions to move vertically together. The swing arms 22 and 23 are biased downward into the transport path A of carton W by a spring 29 extending between the unit frame 21 and the swing arm 23 of press roller 26. The interlocking link 28 is pivotally connected to interlocking pins 22*a* and 23*a* projecting from the swing arms 22 and 23 through the unit frame 21. The interlocking pins 22*a* and 23*a* are movable along arcuate slots 130 and 131 formed in the unit frame 21, respectively. The swing arm 23 has a lower limit of swinging movement set through contact with a positionally adjustable stopper 132.

The unit frame 21 has a pair of guide rollers 133 and 134 attached to forward positions thereof for guiding the adhesive tape T drawn from the adhesive tape roll RT to move along a meandering course. The smaller guide roller 133 is fixed, while the larger guide roller 134 is positionally adjustable backward and forward through a slot 135.

The swing arm 22 includes a guide roller 136 for guiding the adhesive tape T toward the applicator roller 25, and a tape guide 137 for passing the leading end ta of adhesive tape T and guiding the leading end ta to a front surface of applicator roller 25, with an adhesive surface facing upstream of the transport path A (i.e. rightward in FIG. 17).

The swing arm 24 also is biased downward by a spring 138 extending between the swing arm 24 and unit frame 21. The swing arm 24 includes a contact element 139 attached to the free end thereof to be adjustable of extension and retraction to project into a moving track of carton W. The swing arm 24 has a lower limit of swinging movement set through contact with a stopper 140.

As shown in FIGS. 19B and 20, the tape cutter 27 is positionally adjustably and replaceably fastened to a cutter holder 141 attached to the free end of swing arm 24. In front view, the cutting edge of tape cutter 27 is slightly inclined relative to the tape T, so that the tape T may be cut smoothly from an edge thereof.

The cutter holder 141 has a tab-forming suction nozzle 142 attached to the back thereof to be disposed between the applicator roller 25 and tape cutter 27. The nozzle 142 is connected to a vacuum device, not shown, through a hose 143.

An adhesive tape applying operation will be described next with reference also to FIGS. 21 through 24.

(a) In an initial state where a carton W has not arrived at the apparatus, as shown in FIG. 17, the applicator roller 25, press roller 26 and tape cutter 27 supporting the adhesive tape T are on standby in positions projecting to the transport path A of carton W, respectively.

(b) When the carton W transported contacts the applicator roller 25, the applicator roller 25 retracts upward while applying the leading end ta of adhesive tape T to the front surface of carton W. With the upward pivotal movement of applicator roller 25, the interlocking link 28 is pushed rearward to retract the rearward press roller 26 also. As described hereinafter, a tab tc is formed by folding the leading end ta of adhesive tape T with the adhesive surface tucked in in a subsequent applying process.

Figure 21:
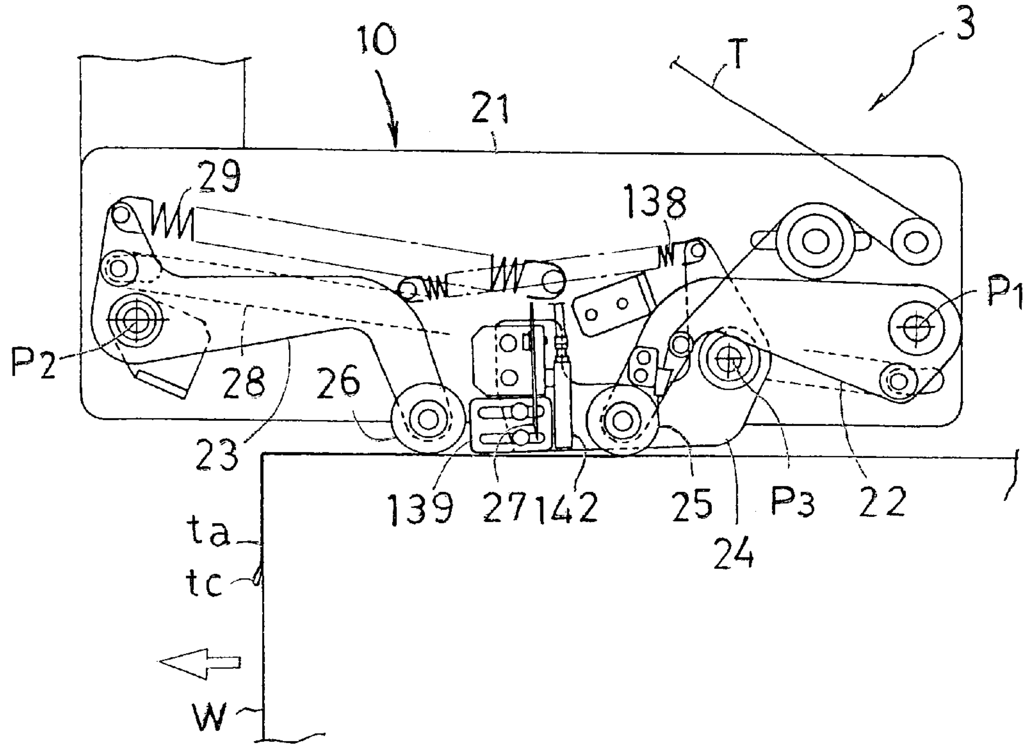
FIG. 21 is a side view of one of the adhesive tape applying mechanisms in a tape applying operation.

(c) As the carton W moves further forward, as shown in FIG. 21, the applicator roller 25 rides on the carton W and applies the adhesive tape T along butt edges of right and left outer flaps. The press roller 26 riding on the carton W is biased downward by the spring 29 to press down the adhesive tape T applied by the applicator roller 25. Consequently, the adhesive tape T is pasted to the upper surface of carton W with a sufficient pressing force.

With the contact element 139 at the distal end of swing arm 24 contacting the carton W, the swing arm 24 is pushed up against the force of spring 138, thereby retracting the tape cutter 27 above the adhesive tape T.

Figure 22:
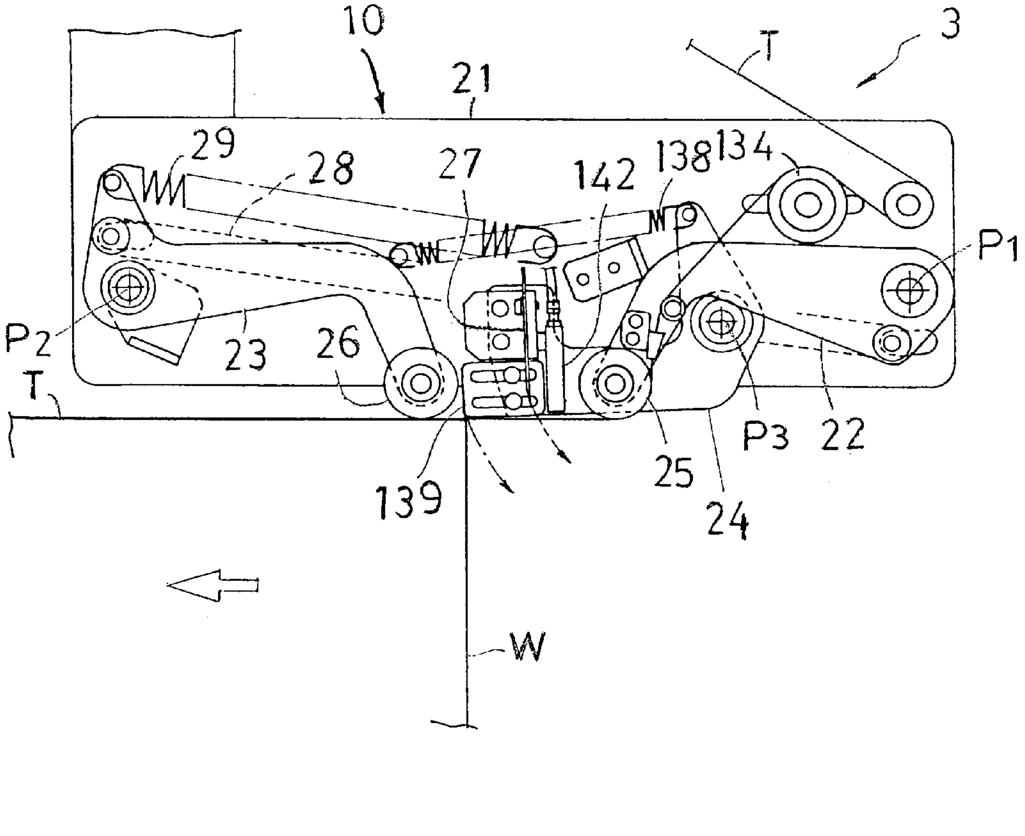
FIG. 22 is another side view of one of the adhesive tape applying mechanisms in the tape applying operation.
Figure 23:
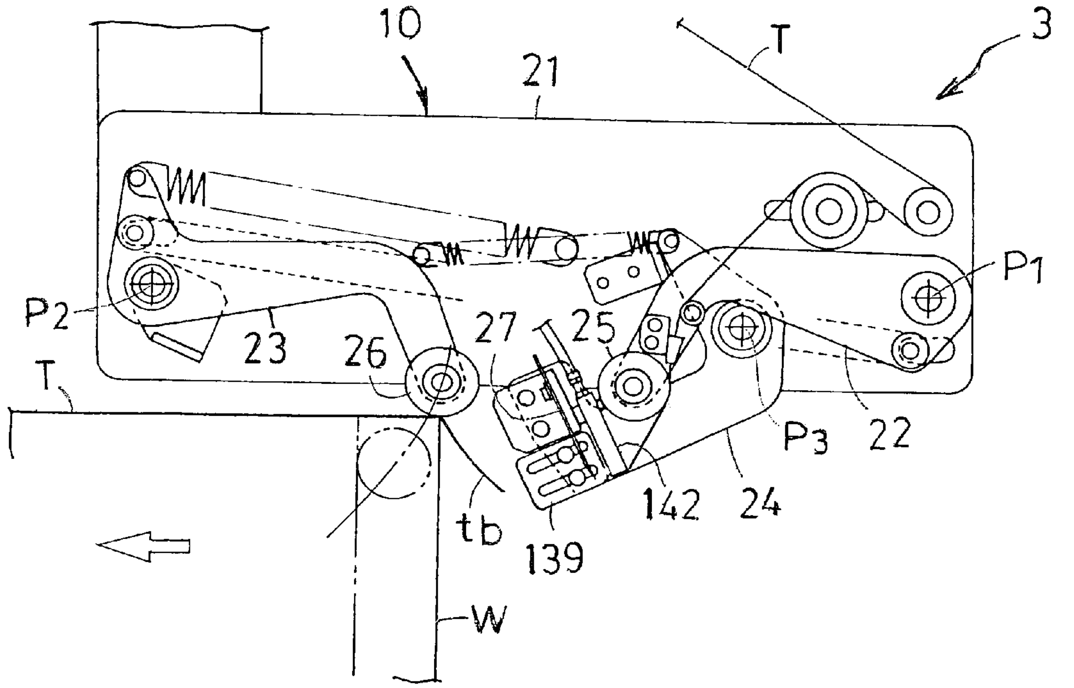
FIG. 23 is a further side view of one of the adhesive tape applying mechanisms in the tape applying operation.

(d) As the carton W moves further forward, as shown in FIG. 22, the applicator roller 25 comes off the carton W but the swing arm 22 interlocked to the swing arm 23 of press roller 26 is retained in the raised position while the press roller 26 remains on the carton W. When the contact element 139 comes off the rear end of carton W, as shown in FIG. 23, the swing arm 24 is swung downward by the spring 138, whereby the tape cutter 27 cuts the adhesive tape T. A tape cutting position may be adjusted by varying a projecting length of the contact element 139 on the swing arm 24.

(e) A descent of swing arm 24 is detected by a sensor not shown, whereupon an operation of suction nozzle 142 is started. A cut end region of adhesive tape T on the supply side, i.e. the leading end ta of tape T to be used for a next carton W, is drawn into the suction nozzle 142 as folded with the adhesive surface tucked in.

The construction of suction nozzle 142 and the tab-forming process using the suction nozzle 142 will be described hereinafter with reference to FIGS. 25 through 29A and 29B.

Figure 25:
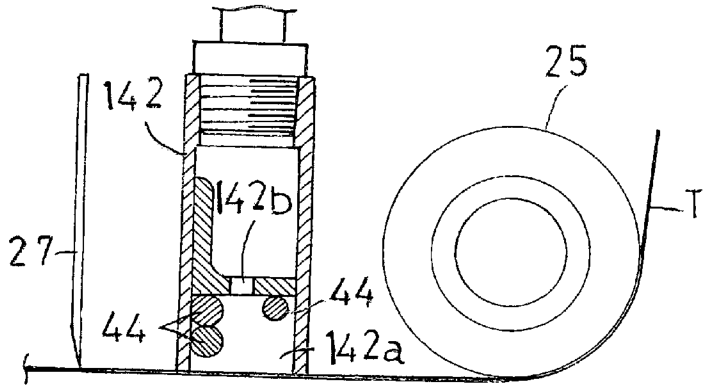
FIG. 25 is a side view in vertical section of the suction nozzle.
Figure 26:
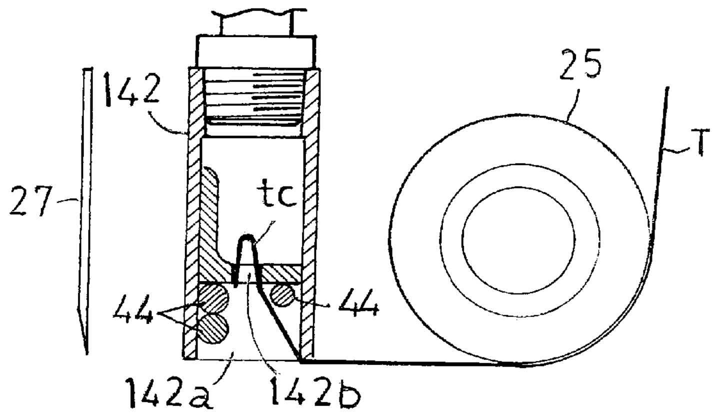
FIG. 26 is a side view in vertical section of the suction nozzle in one operative state.
Figure 27:
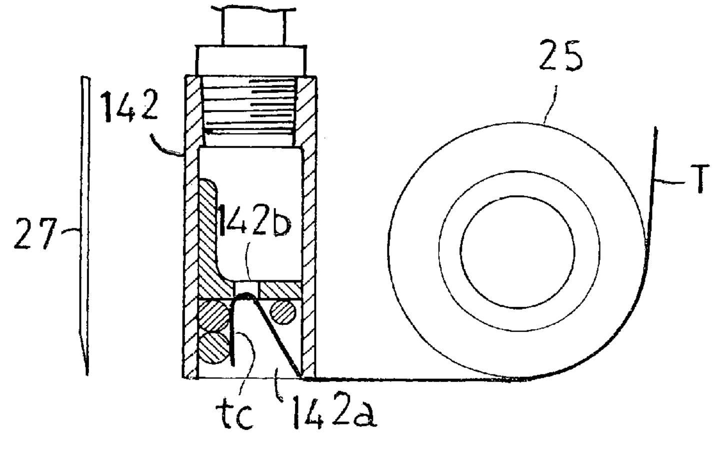
FIG. 27 is a side view in vertical section of the suction nozzle in a different operative state.

As shown in FIG. 25, the suction nozzle 142 defines a lower end inlet opening 142*a* sideways elongated to be slightly wider than the adhesive tapes T and with a fore and aft dimension about 10-odd mm, and a sideways elongate slit 142*b* disposed in an interior position and having a small fore and aft dimension (about 3 mm). Guide elements 44 formed of round rods several millimeters in diameter are arranged outwardly of the slit 142*b* to extend longitudinally thereof. With the suction nozzle 142 having such a construction, a relatively thin and flimsy adhesive tape T having, for example, a backing material 25 μm thick and a total thickness including the adhesive layer being about 50 μm is drawn inwardly of the slit 142*b* and folded over, as shown in FIG. 26, to form a tab tc in the leading end region ta of adhesive tape T. A relatively thick and sturdy adhesive tape T having, for example, a backing material 60 μm thick and a total thickness including the adhesive layer being about 90 μm is folded outside the slit 142*b* as shown in FIGS. 27 and 28. Consequently, as will be clear from a comparison between FIG. 29A showing a tab tc formed on the thin adhesive tape T and FIG. 29B showing a tab tc formed on the thick adhesive tape T, the thinner and flimsier the adhesive tape is, the smaller is the length s of tab tc.

The guide elements 44 are provided to control the bending profile of adhesive tape T sucked through the elongate opening 142*a*. The adhesive protruding from the side edges of adhesive tape T and sticking to the nozzle interior could affect the tape folding operation. Thus, the round rods are used to decrease a sticking area on guide surfaces inside the nozzle.

Figure 24:
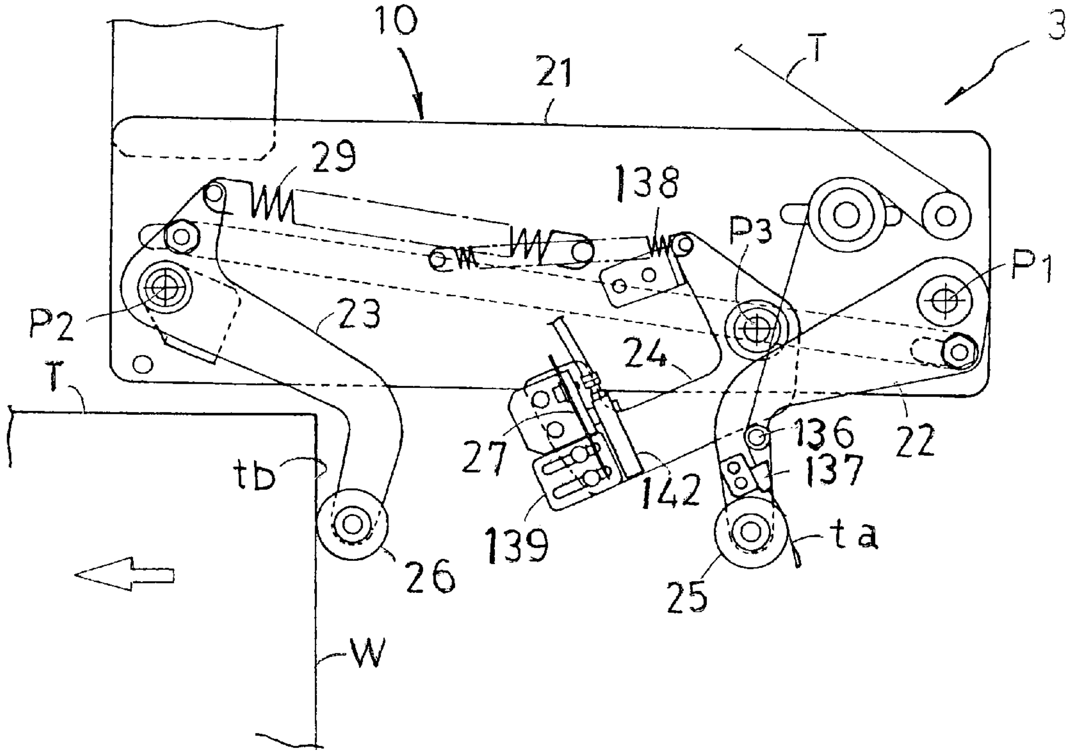
FIG. 24 is side view of one of the adhesive tape applying mechanisms immediately before ending the tape applying operation.
Figure 31:
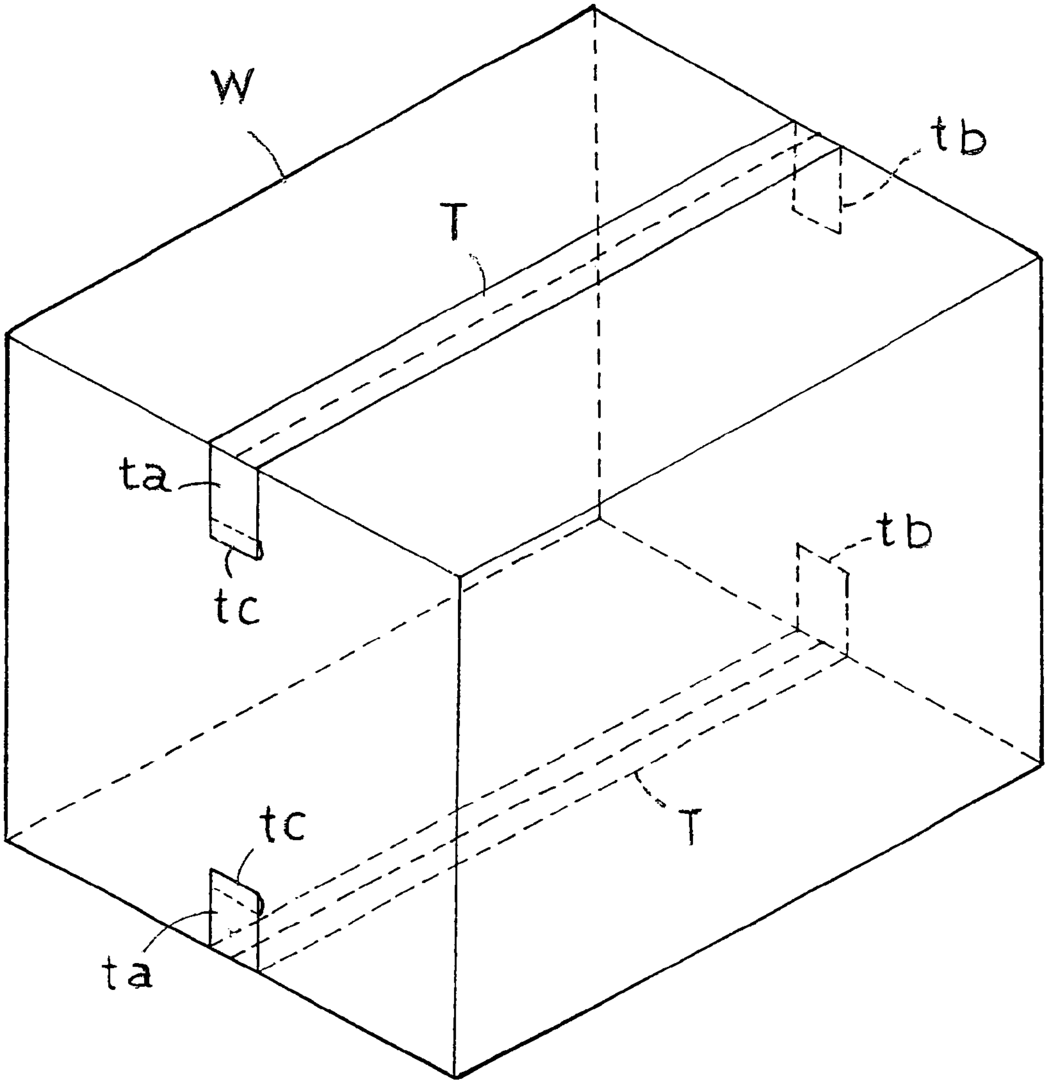
FIG. 31 is a perspective view of a sealed carton.

(f) As the carton W advances from the position shown in FIG. 23, the press roller 27 biased downward, as shown in a phantom line in FIG. 23, moves from the rear end down the rear surface of carton W, pasting the rear end region tb of adhesive tape T around the rear end corner and finally pasting the entire rear end region tb to the rear surface of carton W as shown in FIG. 24. The tape-sealed carton W (FIG. 31) is delivered from the rear end of transport path A. The tab tc formed at the extreme end of forward end region ta of adhesive tape T is not pasted to the carton W, thereby to serve as a catch for tape peeling when opening the carton W.

In this case, the guide roller 134 for guiding the adhesive tape T toward the applicator roller 25 may be positionally adjusted forward or backward to vary the position of the leading end ta of adhesive tape T relative to the applicator roller 25, thereby adjusting the length of adhesive tape T applied to the front surface of carton W. That is, when the guide roller 134 is adjusted rightward in FIG. 22, the tape T has an increased length from a position of winding on the guide roller 134 to the cutting position of tape cutter 27. This results in a lower position of the leading end ta of adhesive tape T relative to the applicator roller 25 when the swing arm 22 is swung down to the standby position, thereby increasing the length of adhesive tape T applied to the front surface of carton W. As noted hereinbefore, the thicker the adhesive tape T is, the greater is the length s of tab tc and the smaller is the substantial length of leading end ta applied to the front surface of carton W. To compensate for this, the leading end ta may be placed at the lower level the thicker the tape T is.

(g) The above step completes one adhesive tape applying operation, whereupon the initial state is reinstated to be ready for handling a next carton. The lower tape applying mechanism 4 is disposed slightly upstream of the upper tape applying mechanism 3 with respect to the transport path A. Thus, the lower tape applying mechanism 4 performs the same process as described above slightly earlier than the upper tape applying mechanism 3.

Figure 32:
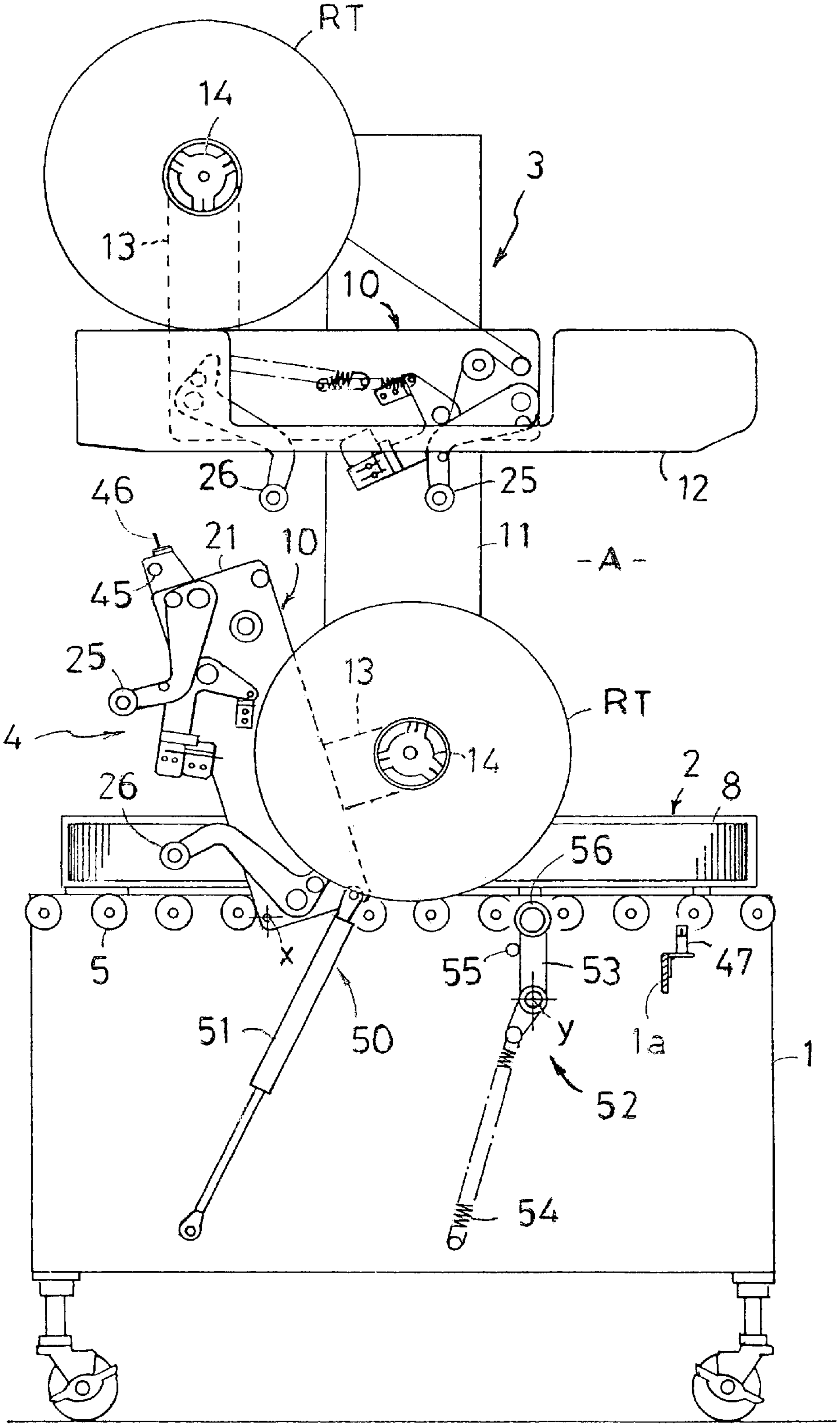
FIG. 32 is a side view showing the lower adhesive tape applying mechanism swung upward to an adhesive tape changing position.
Figure 33:
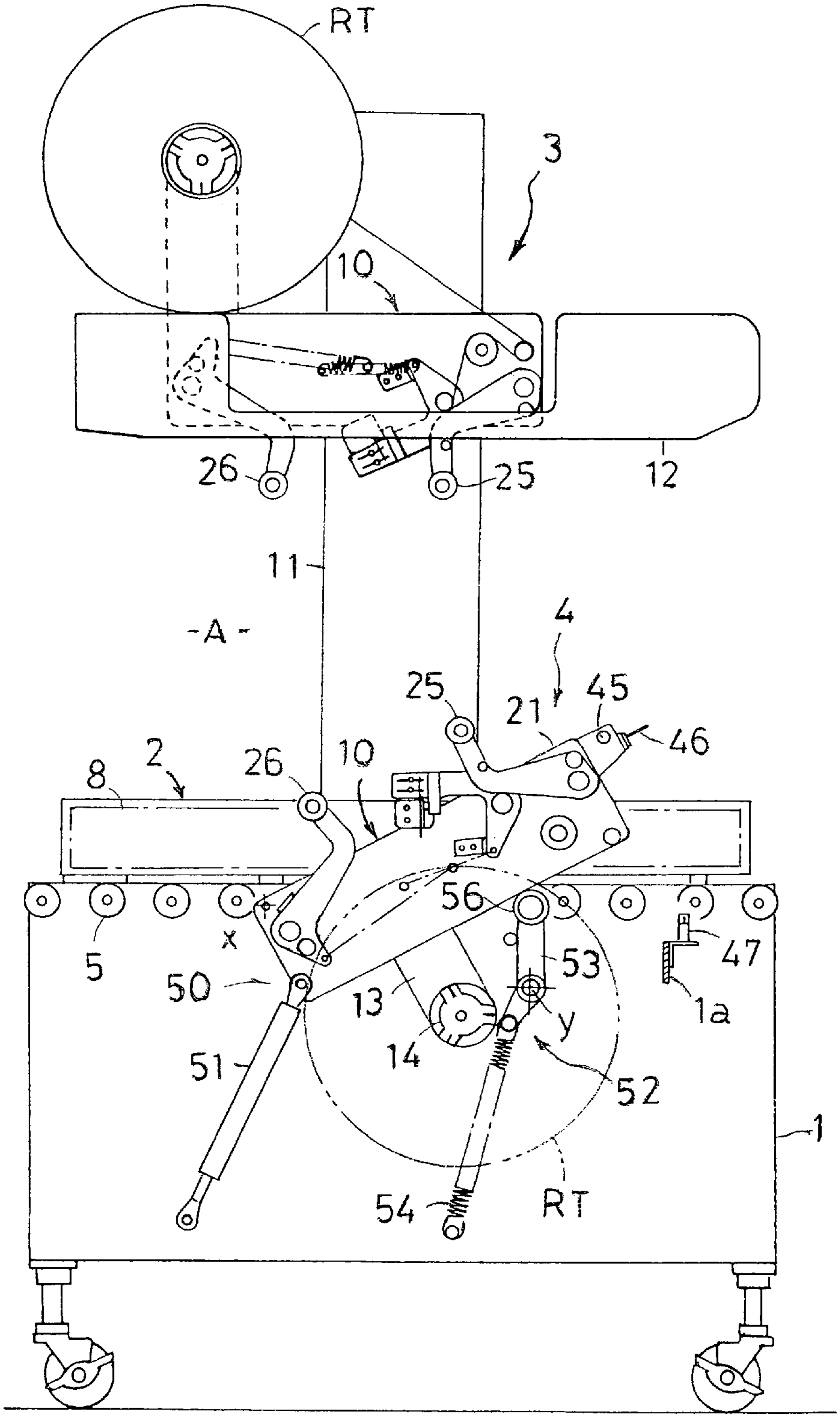
FIG. 33 is a side view showing the lower adhesive tape applying mechanism lowered to a halfway position.
Figure 34:
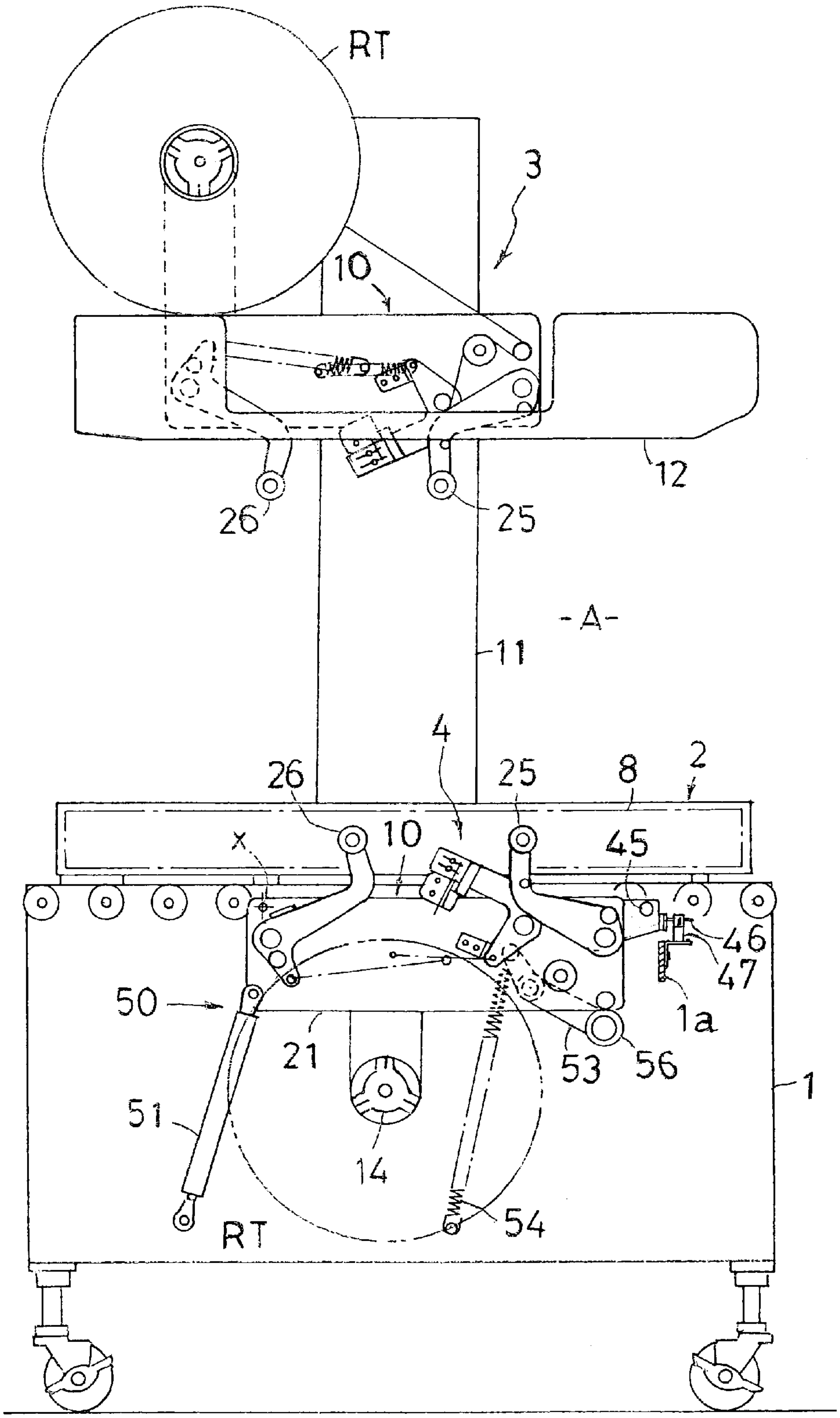
FIG. 34 is a side view showing the lower adhesive tape applying mechanism lowered to an adhesive tape applying position.
Figure 35:
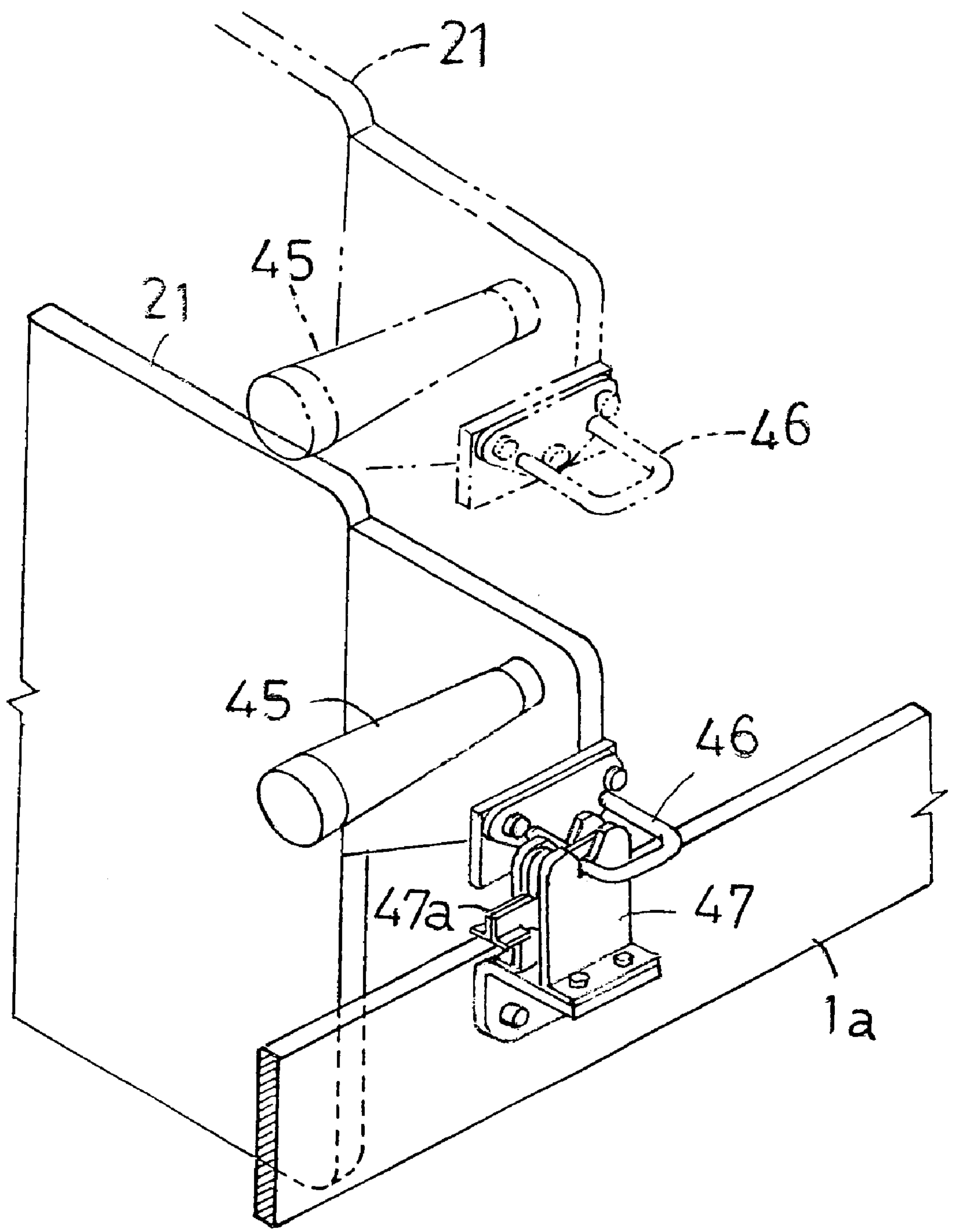
FIG. 35 is a perspective view of a locking mechanism of the lower adhesive tape applying mechanism.

A pivotal support mechanism for the lower adhesive tape applying mechanism 4 will be described next with reference to FIGS. 32 through 35. FIG. 32 is a side view showing the lower adhesive tape applying mechanism swung upward. FIG. 33 is a side view showing the lower adhesive tape applying mechanism lowered to a halfway position. FIG. 34 is a side view showing the lower adhesive tape applying mechanism lowered to an adhesive tape applying position. FIG. 35 is a perspective view of a lock mechanism of the adhesive tape applying mechanism.

The lower adhesive tape applying mechanism 4 is supported by the base block 1 to be vertically pivotable about a pivotal axis x disposed in an upper rear position of applicator unit 10. As shown in FIG. 32, the entire lower tape applying mechanism 4 may be swung to a large extent upward through a space between the groups of right and left idle rollers 5 to an adhesive tape roll changing position. Thus, the operator may change the adhesive tape roll RT of lower tape applying mechanism 4 and put the adhesive tape T in place easily by using a large space over the transport path A.

As shown in FIG. 35, the unit frame 21 of applicator unit 10 has a handgrip 45 and a looped latch element 46 attached to forward positions thereof. On the other hand, a cross frame 1*a* fixed to forward positions of base block 1 has a catcher 47 for releasably engaging the latch element 46. As shown in FIG. 34, the lower adhesive tape applying mechanism 4 lowered to a horizontal posture is locked correctly to the tape applying position with the latch element 46 automatically engaged by the catcher 47. The operator may manipulate an unlock lever 47*a* of the catcher 47 while holding the handgrip 45 to release the latch element 46, and may just raise the tape applying mechanism 4.

A balance mechanism 50 is provided between a position of applicator unit 10 below the pivotal axis x and a lower position of base block 1. The balance mechanism 50 is in the form of a gas damper 51 biased in a direction of extension by a gas sealed therein. The gas damper 51 is extendible and contractable with vertical movement the adhesive tape applying mechanism 4. When the adhesive tape applying mechanism 4 is swung up to the tape roll changing position, the extending and biasing force of gas damper 15 balances the weight of adhesive tape applying mechanism 4. In this way, the adhesive tape applying mechanism 4 is steadily maintained in the adhesive tape roll changing position. The positions in which the gas damper 51 is connected to the applicator unit 10 and base block 1 and the capacity of damper 51 are set appropriately to realize the above function.

In a range where the adhesive tape applying mechanism 4 is swung to a large extent upward, the gas damper 51 can effectively exert the extending and biasing force to counteract a gravitation of adhesive tape applying mechanism 4. When the adhesive tape applying mechanism 4 is lowered a predetermined amount or more from the adhesive tape roll change position, the gravitational swinging moment of adhesive tape applying mechanism 4 exceeds the upward swinging moment based on the extending force of gas damper 51. The gas damper 51 becomes no longer effective, whereby the adhesive tape applying mechanism 4 could fall rapidly by gravity. To check such a rapid fall, a resistance applying mechanism 52 is provided on the base block 1.

As shown in FIG. 32, the resistance applying mechanism 52 includes a receiving arm 53 oscillatable about an axis y, and a spring 54 for biasing the receiving arm 53 counterclockwise in FIG. 32. When the adhesive tape applying mechanism 4 is erected to the adhesive tape roll changing position, the biased receiving arm 53 is in a standby position resting on a stopper 55. When the adhesive tape applying mechanism 4 is lowered by a predetermined angle from the tape roll changing position, as shown in FIG. 33, a support roller 56 mounted at the free end of receiving arm 53 of the resistance applying mechanism 52 bears, from below, the unit frame 21 at a forward portion of a bottom edge thereof. With a subsequent descent of the adhesive tape applying mechanism 4, the receiving arm 53 is swung clockwise against the force of spring 54. In this way, an appropriate resistance is applied to the descent of adhesive tape applying mechanism 4. The tape applying mechanism 4, even when the operator should lose hold thereof, would not fall rapidly with the latch element 46 crashing into the catcher 47. To operate the catcher 47 to effect a locking engagement, the adhesive tape applying mechanism 4 may only be pressed down manually.

This invention may be implemented in the following modified forms besides the foregoing embodiment:

(1) The point of connection between the gas damper 51 and base block 1 may be adapted positionally adjustable. Then, an appropriate balance may be set to accommodate different weights of adhesive tape applying mechanism 4 and different characteristics of gas damper 51.

(2) As the balance mechanism 50, the gas damper 51 may be replaced with one or more tension springs or compression springs for biasing the adhesive tape applying mechanism 4 upward.

(3) The resistance applying mechanism 52 may be adapted to apply a frictional resistance to the downward swing of adhesive tape applying mechanism 4 only in a predetermined range of descent.

(4) As shown in FIG. 30, the suction nozzle 142 may include, mounted therein, a guide element 44 defining a sideways elongated slit 142*b*. In this case, the guide element 44 may have an inner surface formed rugged for increased adhesion proofness or coated with an adhesion-proof layer of fluororesin, for example. This is advantageous in avoiding the adhesive tape T inadvertently sticking to the inner surface to affect the tape folding operation.

The present invention may be embodied in other specific forms without departing from the spirit or essential attributes thereof and, accordingly, reference should be made to the appended claims, rather than to the foregoing specification, as indicating the scope of the invention.

What is claimed is:

1. A sealing apparatus comprising:

an adhesive tape applying mechanism disposed in a tape applying position below a transport path along which a workpiece is horizontally transported, said adhesive tape applying mechanism including an adhesive tape roll and an applicator unit, an adhesive tape drawn from said adhesive tape roll being guided to and wound around an applicator roller of said applicator unit, to be applied continuously to surfaces of said workpiece transported along said transport path;

wherein said adhesive tape applying mechanism disposed below said transport path vertically pivots from the tape applying position to an adhesive tape roll changing position so that the adhesive tape applying mechanism is exposed above said transport path.

2. A sealing apparatus as defined in claim 1, wherein:

said adhesive tape applying mechanism is vertically pivotable about a pivotal axis defined by pivot grooves each having an open end and a pivot pin received in said pivot grooves;

positioning means being disposed away from said pivotal axis for receiving and supporting said adhesive tape applying mechanism in said tape applying position against downward movement;

said adhesive tape applying mechanism being detachably supported through said pivotal axis and said positioning means.

3. A sealing apparatus as defined in claim 2, wherein:

said pivot grooves each have a hooked shape with one end thereof open vertically;

said pivotal axis being set to a deep end of said hooked shape;

said positioning means including engaging grooves each having a vertically open end, and an engaging pin engageable with said engaging grooves.

4. A sealing apparatus as defined in claim 1, further comprising an automatic lock mechanism for automatically locking said adhesive tape applying mechanism to said adhesive tape changing position when said adhesive tape applying mechanism is swung upward to said adhesive tape changing position.

5. A sealing apparatus as defined in claim 1, further comprising a stopper for maintaining said adhesive tape applying mechanism in said adhesive tape changing position after said adhesive tape applying mechanism is swung upward to said adhesive tape changing position.

6. A sealing apparatus as defined in claim 1, further comprising slide means for sliding said adhesive tape applying mechanism to and fro along a transport direction of said workpiece.

7. A sealing apparatus as defined in claim 1, further comprising a balance mechanism operable, when said adhesive tape applying mechanism is swung up to said adhesive tape roll changing position, to apply an upward biasing force counteracting a gravitational descending force of said adhesive tape applying mechanism, thereby steadily maintaining said adhesive tape applying mechanism in said adhesive tape roll changing position.

8. A sealing apparatus as defined in claim 7, wherein said balance mechanism comprises an extendible and retractable gas damper extending between said adhesive tape applying mechanism and a frame.

9. A sealing apparatus as defined in claim 7, wherein said balance mechanism comprises an extendible and retractable spring mechanism extending between said adhesive tape applying mechanism and a frame.

10. A sealing apparatus as defined in claim 7, further comprising a resistance applying mechanism for applying a resistance to a descent of said adhesive tape applying mechanism in a range from a position to which said adhesive tape applying mechanism is lowered a predetermined amount from said adhesive tape roll changing position, to said tape applying position.

11. A sealing apparatus as defined in claim 1, wherein said adhesive tape applying mechanism includes a tape cutting mechanism for adjustably cutting a length of said adhesive tape applied to said workpiece.

12. A sealing apparatus as defined in claim 1, wherein said adhesive tape applying mechanism includes tape control means for placing said adhesive tape constantly in contact with a rugged surface of said workpiece to apply said adhesive tape thereto.

13. A sealing apparatus as defined in claim 1, wherein said adhesive tape applying mechanism includes tape folding means for folding back one of cut edges of said adhesive tape applied to said workpiece to join adhesive surface portions of said adhesive tape together.

14. A sealing apparatus as defined in claim 13, wherein said tape folding means comprises a suction nozzle for sucking a region adjacent said one of cut edges to fold said region with said adhesive surface portions placed inside.

15. A sealing apparatus as defined in claim 1, further comprising distortion correcting means for correcting a distortion of said workpiece occurring in time of initial assembly.

16. A sealing apparatus as defined in claim 1, further comprising moving means for moving said apparatus.

17. A sealing apparatus as defined in claim 1, further comprising an upper adhesive tape applying mechanism opposed, across said workpiece transported, to said adhesive tape applying mechanism disposed below.

18. A sealing apparatus as defined in claim 17, wherein said upper adhesive tape applying mechanism has an adjustable operative position for applying said adhesive tape to said workpiece.

19. A sealing apparatus as defined in claim 17, wherein said upper adhesive tape applying mechanism includes a tape cutting mechanism for adjustably cutting a length of said adhesive tape applied to said workpiece.

20. A sealing apparatus as defined in claim 17, wherein said upper side adhesive tape applying mechanism includes tape control means for placing said adhesive tape constantly in contact with a rugged surface of said workpiece to apply said adhesive tape thereto.

21. A sealing apparatus as defined in claim 17, wherein said upper adhesive tape applying mechanism includes tape folding means for folding back one of cut edges of said adhesive tape applied to said workpiece to join adhesive surface portions of said adhesive tape together, thereby to facilitate separation of said adhesive tape applied to said workpiece.

22. A sealing apparatus as defined in claim 21, wherein said tape folding means comprises a suction nozzle for sucking a region adjacent said one of cut edges to fold said region with said adhesive surface portions placed inside.

* * * * *